US009712543B2

(12) United States Patent
Mraz et al.

(10) Patent No.: US 9,712,543 B2
(45) Date of Patent: Jul. 18, 2017

(54) SYSTEM FOR REMOTELY MONITORING STATUS INFORMATION OF DEVICES CONNECTED TO A NETWORK

(71) Applicant: Owl Computing Technologies, Inc., Ridgefield, CT (US)

(72) Inventors: Ronald Mraz, South Salem, NY (US); Frederick Clarke, New Milford, CT (US)

(73) Assignee: Owl Cyber Defense Solutions, LLP, Ridgefield, CT (US)

( * ) Notice: Subject to any disclaimer, the term of this patent is extended or adjusted under 35 U.S.C. 154(b) by 792 days.

(21) Appl. No.: 13/747,632

(22) Filed: Jan. 23, 2013

(65) Prior Publication Data

US 2014/0208420 A1    Jul. 24, 2014

(51) Int. Cl.
    *H04L 29/06* (2006.01)
(52) U.S. Cl.
    CPC ................ *H04L 63/1408* (2013.01)
(58) Field of Classification Search
    CPC .................................................. H04L 63/1408
    USPC .......................................................... 726/22
    See application file for complete search history.

(56) References Cited

U.S. PATENT DOCUMENTS

| 6,023,507 | A  | * | 2/2000  | Wookey | G06F 11/2294 380/285 |
|---|---|---|---|---|---|
| 8,068,415 | B2 |   | 11/2011 | Mraz | |
| 2005/0033984 | A1 | * | 2/2005  | Doherty | G06F 21/554 726/4 |
| 2005/0234909 | A1 | * | 10/2005 | Bade | G06F 21/552 |
| 2007/0233842 | A1 | * | 10/2007 | Roberts | G06F 21/552 709/223 |
| 2008/0259929 | A1 | * | 10/2008 | Mraz | H04L 12/5601 370/395.1 |
| 2010/0212012 | A1 | * | 8/2010  | Touboul | G06F 21/554 726/23 |
| 2011/0296194 | A1 | * | 12/2011 | Herkes | G06F 21/34 713/185 |
| 2014/0208420 | A1 | * | 7/2014  | Mraz | H04L 63/1408 726/22 |

OTHER PUBLICATIONS

FTDI Chip Application Note: How to Detect the Connection and Removal of USB Devices on a System (2010).

* cited by examiner

*Primary Examiner* — Harris C Wang
(74) *Attorney, Agent, or Firm* — Economou Silfin LLP; John S. Economou

(57) ABSTRACT

A system for monitoring the status of one or more networks and/or of devices coupled to each of the one or more networks. Status monitoring applications are associated with the networks and/or devices. The status monitoring applications output a respective status log file containing information about the system status of the associated network or device. In one embodiment, the system status is derived from the Windows Event Log. The status monitoring applications are coupled to a remote receive module via a one-way data link or a firewall. The remote receive module receives the log files and processes the log files to either identify any unauthorized status conditions identified therein or to generate a cumulative log file consisting of events occurring over a predetermined time interval.

30 Claims, 26 Drawing Sheets

FIG. 13

| Date Time | Filename | Error Details |
|---|---|---|
| 03/05-10:53:55 | q203-test.dat | isValidPacketType: invalidpacket: FADE, bytesread = 144 |
| 03/05-10:59:25 | q300mb.dat | data receive timeout (Duration = 00:02:00), PktCount = 10810 |
| 03/05-10:59:55 | q300mb.dat | FileSizes: Exp: 314,572,800, Accum: 173,506,068 |
| 12/15-18:22:38 | p200mb.dat | ERROR, ABORTED...received NEW StartOfMsg, Current PktCount = 8858 |
| 12/15-18:30:35 | j203-test.dat | ERROR, ABORTED...received NEW StartOfMsg, Current PktCount = 2546 |
| 12/15-19:08:03 | j203-test.dat | waitForStartPacket: Received non-header buffer, PktType: 0FF0 (DATA), bytes_received: 16272 |
| 12/15-19:09:53 | j203-test.dat | waitForStartPacket: Received non-header buffer, PktType: 0FF0 (DATA), bytes_received: 16272 |
| 01/12-13:52:21 | q300mb.dat | data receive timeout (Duration = 00:02:00), PktCount = 4746 |
| 01/12-13:52:21 | q300mb.dat | FileSizes: Exp: 314,572,800, Accum: 76,166,740 |
| 03/05-10:53:55 | q203-test.dat | isValidPacketType: invalid packet: FADE, bytesread = 144 |
| 03/05-10:59:25 | q300mb.dat | data receive timeout (Duration = 00:02:00), PktCount = 10810 |
| 03/05-10:59:25 | q300mb.dat | FileSizes: Exp: 314,572,800, Accum: 173,506,608 |
| 12/15-18:22:38 | p200mb.dat | ERROR, ABORTED...received NEW StartOfMsg, Current PktCount = 8858 |
| 12/15-18:30:35 | j203-test.dat | ERROR, ABORTED...received NEW StartOfMsg, Current PktCount = 2546 |
| 12/15-19:08:03 | j203-test.dat | waitForStartPacket: Received non-header buffer, PktType: 0FF0 (DATA), bytes_received: 16272 |
| 12/15-19:09:53 | j203-test.dat | waitForStartPacket: Received non-header buffer, PktType: 0FF0 (DATA), bytes_received: 16272 |

FIG. 23

| Id | Filename | Size (kb) | Select All ☐ |
|---|---|---|---|
| 1 | ecds-red_TPTS_RED_1.log | 1,878 | ☐ |
| 2 | ecds-red_TPTS_RED_1-20110216-1297848747.log | 1,992 | ☐ |
| 3 | ecds-red_TPTS_RED_1-20110214-1297657935.log | 1,572 | ☐ |
| 4 | ecds-red_TPTS_RED_1-20110215-1297816478.log | 1,989 | ☐ |
| 5 | ecds-red_TPTS_RED_1-20110213-1297625657.log | 1,992 | ☐ |
| 6 | ecds-red_TPTS_RED_1-20110213-1297589576.log | 1,992 | ☐ |
| 7 | ecds-red_TPTS_RED_1-20110211-1297452879.log | 849 | ☐ |
| 8 | ecds-red_TPTS_RED_1-20110215-1297762359.log | 1,993 | ☐ |
| 9 | ecds-red_TPTS_RED_1-20110212-1297539284.log | 1,992 | ☐ |
| 10 | ecds-red_TPTS_RED_1-20110215-1297744325.log | 1,572 | ☐ |
| 11 | ecds-red_TPTS_RED_1-20110212-1297557335.log | 1,992 | ☐ |
| 12 | ecds-red_TPTS_RED_1-20110215-1297780390.log | 1,992 | ☐ |
| 13 | ecds-red_TPTS_RED_1-20110212-1297503192.log | 1,992 | ☐ |
| 14 | ecds-red_TPTS_RED_1-20110214-1297712056.log | 1,992 | ☐ |
| 15 | ecds-red_TPTS_RED_1-20110216-1297830716.log | 1,573 | ☐ |
| 16 | ecds-red_TPTS_RED_1-20110211-1297470923.log | 1,992 | ☐ |
| 17 | ecds-red_TPTS_RED_1-20110213-1297607616.log | 1,992 | ☐ |
| 18 | ecds-red_TPTS_RED_1-20110212-1297521240.log | 1,992 | ☐ |

FIG. 24

```
01/15-00:00:41 Rcvd: 104,867,716 (50.00%) Rate: 14.318 (MB/s) Dur: 00:00:07  DR: 1.00/49 msec FW: 0.00/0 msec
01/15-00:00:49 File: p200mb.dat, Trans: 209,715,200 (bytes), Time: 00:00:14.467, Rate: 13.825 (MB/s), MD5 Passed
01/15-00:00:49
01/15-00:00:49 File: p201-test.dat, Trans: 819200 (bytes), Time: 00:00:00.089, Rate: 8.778 (MB/s), MD5 Passed
01/15-00:00:49 File: p202-test.dat, Trans: 2,097,152 (bytes), Time: 00:00:00.187, Rate: 10.695 (MB/s), MD5 Passed
01/15-00:00:50 File: p203-test.dat, Trans: 10,485,760 (bytes), Time: 00:00:00.769, Rate: 13.004 (MB/s), MD5 Passed
01/15-00:00:51 File: q201-test.dat, Trans: 10,485,760 (bytes), Time: 00:00:00.757, Rate: 13.210 (MB/s), MD5 Passed
01/15-00:00:51
01/15-00:00:51 Info: q202-test.dat, Size: 20,971,520 (bytes) . . . receiving (send pausing 0 seconds)
01/15-00:00:53 File: q202-test.dat, Trans: 20,971,520 (bytes), Time: 00:00:01.646, Rate: 12.151 (MB/s), MD5 Passed
01/15-00:00:53
01/15-00:00:53 File: q203-test.dat, Trans: 20,971,520 (bytes), Time: 00:00:01.646, Rate: 12.151 (MB/s), MD5 Passed
01/15-00:00:53
03/05- 10:53:55 isValidPacketType:  ERROR: invalid packet: FADE, bytesread = 144 ——2501
03/05- 10:53:55 Dump Common Packet Header:
03/05- 10:53:55 Type = 0xFADE (UNKNOWN PACKET TYPE: 0xFADE)
03/05-10:53:55 Vpi, Vpi = 0, 0 (0x0000000, 0x 0000000)
03/05-10:53:55 Count = 1
03/05-10:53:55 Filename =
03/05-10:59:25
03/05-10:59:25 File: q300mb.dat, ERROR: data receive timeout (Duration = 00:02:00), PktCount = 10810 ——2502
03/05-10:59:25 File: q300mb.dat, ERROR: FileSizes: Exp: 314,572,800, Accum: 173,506,068 ——2503
01/15-00:00:53 Info: q300mb.dat, Size: 314,572,800 (bytes) . . . receiving (send pausing 0 seconds)
01/15-00:01:00 Rcvd: 104,867,716 (33.34%) Rate: 15.558 (MB/s) Dur: 00:00:07  DR: 0.92/44 msec FW: 0.00/0 msec
01/15-00:01:06 Rcvd: 209,735,432 (66.67%) Rate: 15.799 (MB/s) Dur: 00:00:06  DR: 0.90/1 msec FW: 0.00/0 msec
01/15-00:01:13 File: q300mb.dat, Trans: 314,572,800 (bytes), Time: 00:00:19.102, Rate 15.705 (MB/s), MD5 Passed
01/15-00:01:13
01/15-00:01:13
```

Owl Computing Technologies,® Inc.

Wednesday, December 14, 2011 5:50:28PM

About
Legend
Logged in as opmsadmin
Log out

OWL PERFORMANCE MANAGEMENT SERVICE

— 2601

| Home | Dashboard | Configure | Reconcile | Reports | Admin |

▽ Reconcile Summary
Reconcile
Consolidated View
Missing Files

▽ Problems
Owl Applications
Systems

OPMS Reconciliation Overview
Program Start Time: Wed. Dec. 14 13:44:55 2011
Last Updated: 17:50:28 GMT 0500 (Eastern Standard Time)
Updated every 5 seconds
OPMS Version: 2.6.4.2
Logged in as opmsadmin

— 2603

Reconcile Statistics Summary
Number of Mapped Systems: 2
Number of Missing Files: 0
Number of Applications: 2
Number of Errors: 0

— 2604

OPMS Reconciliation Summary

| Source System | App | Src Type | Instance | Files Sent | Destination System | Type | Files Received | Missing Files |
|---|---|---|---|---|---|---|---|---|
| fredblue.owlcomputing.com | DFTS | BLUE | 1 | 2242 | fredred.owlcomputing.com | RED | 2242 | 0 |
| fredblue.owlcomputing.com | RFTS | CLIENT | 1 | 2918 | fredred.owlcomputing.com | SERVER | 2918 | 0 |

SYSTEM FOR REMOTELY MONITORING STATUS INFORMATION OF DEVICES CONNECTED TO A NETWORK

FIELD OF INVENTION

This invention relates generally to a system for remotely monitoring, via a one-way data link or firewall, status identified in system log files produced by devices coupled to a network.

BACKGROUND OF THE INVENTION

Protection of computer or data networks from undesired and unauthorized data disclosure, interception or alteration has been a perennial concern in the field of computer and network security, for which firewalls and anti-spyware software have been developed to address security threats to computers and networks connected to the Internet and to protect them from possible cyber-attacks, such as Trojan horse-type viruses or worms that may trigger undesired and unauthorized data disclosure by these computers and networks. However, for high security computer networks, such as those used by government agencies, intelligence communities, and certain commercial applications, conventional network security devices such as firewalls may not provide sufficiently reliable protection from undesired disclosure.

A high level of network security can be attained through the use of one-way data links, which isolate secure networks from security breaches (i.e., undesired and unauthorized data flow out of the secure network) while still allowing data from a low security environment to enter the network in a controlled manner. Various apparatus and methods have been developed for implementing one-way data transfer to a secure network.

Methods and systems for one-way data transfer include standard Internet firewalls as well as operating systems configured with specialized rules for restricted unidirectional information flow. Systems such as these are designed to have great flexibility, but are now being asked to perform strict unidirectional data transfer. The complexity of one-way data transfer is such that it is difficult to validate and verify that the controlled interface is not strictly one-way, failsafe and resistant to reconfiguration through administrator error or malicious intent. Additionally, it is difficult to prove in complex systems that data is not bypassing the one way security feature.

As an alternative to software-based one-way data transfer, hardware-based unidirectional interfaces may also be used. A common hardware based approach has been to cut the return lines of RS-232 serial interfaces and then spoof the two-way link layer protocols of a point-to-point Ethernet connection. By maintaining the unidirectional policy of the controlled interface in hardware, the one-way nature and non-bypassable operation of the device can be validated to a high degree of assurance. However, some designs in which the unidirectional aspect of the controlled interface is provided by cable configuration between the enclaves require additional mitigations to ensure against failure due to incorrect configuration.

Highly engineered solutions, such as the Owl Computing Technologies Dual Diode, (described in U.S. Pat. No. 8,068,415, the disclosure of which is incorporated herein by reference) provide a direct point-to-point optical link between the enclaves. The unidirectionality of the data transfer is enforced in the circuitry of the network interface cards at both enclave endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

In such systems, shown in block diagram form in FIG. 1, a first server (the Blue Server) 101 includes a transmit application 102 for sending data across a one-way data link, e.g., optical link 104. First server 101 also includes a transmit (here a phototransmission) component, e.g., optical emitter 103. Transmit application 102 provides data to the optical emitter for transmission across the optical link 104. A second server (the Red Server) 111 includes a receive (here a photodetection) component, e.g., optical detector 113, for receiving data from the optical link 104, which data is then provided to the receive application 112 for further processing. The first server 101 is only able to transmit data to second server 111, since it does not include any receive circuitry (e.g., an optical detector comparable to detector 113) and the second server 11 is only able to receive data from first server 101, since it does not include any transmit circuitry (e.g., an optical emitter comparable to emitter 103). In such a configuration, the first server 101 is usually included within a first security domain and the second server 111 is usually included within a second, different security domain, which may have different security requirements from the first domain. This configuration presents difficulty in monitoring that certain security requirements are maintained.

Operating systems included with computer systems generate internal messages which report user access, service errors, and other information about the operation of the computer system. These messages are typically recorded in a log, managed by the operating system and are therefore called log messages. These log messages may be recorded in files on the local file system, for example, computing systems based on the Microsoft Windows® operating system record log messages to the local file system via the Windows Event Log.

It is an object of the present invention to provide a system which provides the ability to detect security requirement violations associated with the first server and/or the second server, and/or computers and networks coupled to the first server and second server.

SUMMARY OF THE INVENTION

The present invention is addressed to a system for monitoring the status of a first and second network and/or of devices coupled to the first or second network. The system includes a send node and a first status monitoring application associated with the send node which outputs a first status log file containing information about status of a first network coupled to the send node and/or of any first devices coupled to the first network, a receive node coupled to the send node via a data link. The system also includes a second status monitoring application associated with the receive node which outputs a second status log file containing information about the status of a second network coupled to the send node and/or of any second devices coupled to the second network and a receive module for receiving and processing the first status log file and the second status log file to either identify any unauthorized status conditions identified in the first status log file and/or the second status log file or to store the first status log file and/or the second status log file. Preferably, the data link is a one-way data link, wherein the send node is on a first server and is only able to send data over the one-way data link, and wherein the receive node is on a second server and is only able to receive data over the one-way data link. Preferably, the receive module is on a third server, separate from the first server and the second server.

Preferably, the system may also include a first communications link for coupling the first status monitoring application to the receive module and a second communications link for coupling the second status monitoring application to the receive module. The first communications link may transfer the first status log file from the first status monitoring application to the receive module and wherein the second communications link may transfer the second status log file from the second status monitoring application to the receive module. Preferably, the first communications link and the second communications link may be one-way data links. Further, the first status monitoring application may output the first status log file to the one-way data link and the system may also include a pass-through circuit associated with the receive node for receiving the first status log file from the one-way data link and a communications link for coupling the second status monitoring application and the pass-through circuit to the receive module. Preferably, the communications link may transfer the first status log file from the pass-through circuit to the receive module and the second status log file from the second status monitoring application to the receive module. Preferably, the communications link is a one-way data link. In an embodiment, the information included within the first status log file may indicate whether a removable storage device is mounted on any of the first devices and the information included within the second status log file may indicate whether a removable storage device is mounted on any of the second devices. In an alternative, the first status log file created by the first status monitoring application may include the information about status of the first network coupled to the send node and/or of any first devices coupled to the first network; and wherein the second status log file created by the second status monitoring application may include the information about status of the second network coupled to the send node and/or of any second devices coupled to the second network. The first status log file may be a preexisting log file which is modified by the first status monitoring application to add the information about status of the first network coupled to the send node and/or of any first devices coupled to the first network and the second status log file may be a preexisting log file which is modified by the second status monitoring application to add the information about status of the second network coupled to the send node and/or of any second devices coupled to the second network.

In one alternative embodiment, the present invention is addressed to a system for monitoring the status of a first network and/or of devices coupled to the first network and includes a send node and a first status monitoring application associated with the send node which outputs a first status log file containing information about the status of a first network coupled to the send node and/or of any first devices coupled to the first network. The system also includes a receive node coupled to the send node via a data link and a receive module for receiving the first status log file and for identifying any unauthorized status conditions identified in the first status log file.

In another alternative embodiment, the present invention is addressed to a system for monitoring the status of a second network and/or of devices coupled to the second network and includes a send node and a receive node coupled to the send node via a data link. The system also includes a second status monitoring application associated with the receive node which outputs a second status log file containing information about the status of a second network coupled to the send node and/or of any second devices coupled to the second network and a receive module for receiving the second status log file and for identifying any unauthorized status conditions identified in the second status log file.

In a further alternative embodiment, the present invention is addressed to a system for monitoring status of at least one device coupled to a network and includes a network and at least one device coupled to the network and configured to generate and output a status log file containing information about the status of the at least one device. The system further includes a data link having a first end coupled to the network and a second end and a receive module coupled to the second end of the data link and configured to receive and process the status log file. Preferably, the receive module may process the status log file to identify any unauthorized status conditions identified therein. Alternatively, the receive module may process the status log file by generating a cumulative log file consisting of all status events identified by an operating system for the associated at least one device that occur over a fixed period of time. In a further alternative, the receive module may process the status log file by generating a cumulative log file consisting of a predetermined subset of all status events identified by an operating system for the associated at least one device that occur over a fixed period of time. Preferably, the data link is a one-way data link in which data only passes from the first end to the second end and no data passes from the second end to the first end. Alternatively, the data link is a firewall configured to pass data from the first end to the second end and to block data from passing from the second end to the first end. Preferably, at least part of the information in the status log file may indicate whether a removable storage device is mounted on the associated device. Alternatively, the information in the status log file may consists of all system events identified by an operating system running on the at least one device.

In a still further alternative embodiment, the present invention is addressed to a system for monitoring status of a plurality of devices coupled to a network and includes a network and a plurality of devices coupled to the network, each configured to generate and output a status log file containing information about status of the device. The system also includes a data link having a first end to the network and a second end and a receive module coupled to the second end of the data link and configured to receive the status log files. Preferably, the information in the status log file consists of all system events identified by an operating system running on an associated one of the plurality of devices. In an embodiment, the operating system may be Microsoft Windows® and the system events consist of all events in the Windows Event Log. In a further embodiment, at least one of the plurality of devices operates using a first operating system and at least another of the plurality of devices operates using a second operating system, different from the first operating system. The first operating system may be Microsoft Windows® and the second operating system may be Linux. In another further embodiment, at least one of the plurality of devices has a CPU having a first computer architecture and at least another of the plurality of devices has a CPU having a second computer architecture, different from the first computer architecture. The first computer architecture may be x86 and the second computer architecture may be SPARC.

BRIEF DESCRIPTION OF THE DRAWINGS

The following detailed description, given by way of example and not intended to limit the present invention solely thereto, will best be understood in conjunction with the accompanying drawings in which:

FIG. 13 is a screen shot of the OPMS web server browser window showing the alert notification form page of the OPMS administrative setup panel;

FIG. 23 is a screen shot of the OPMS web server browser window showing the OPMS system error display screen;

FIG. 24 is a screen shot of the OPMS web server browser window showing a sample list of available logs;

FIG. 25 is a screen shot of the OPMS web server browser window showing a duplicate log file with errors;

FIG. 26 is a screen shot of the OPMS web server web browser window showing the reconciliation screen in normal operation with no file transfer errors detected;

DETAILED DESCRIPTION OF THE PREFERRED EMBODIMENT

In the present disclosure, like reference numbers refer to like elements throughout the drawings, which illustrate various exemplary embodiments of the present invention.

The Owl Performance Management Service (OPMS) system provides the ability to remotely monitor logs produced by both custom Owl applications and other third party software applications that produce log files on various different source platforms. As described herein, the OPMS system delivers performance and status information in real time via a user-friendly, web-based interface.

The OPMS system consists of three software components, which may operate on three (or more) separate servers: (1) the OPMS send module; (2) the OPMS receive module; and (3) the OPMS web module. The OPMS send module has two parts, a tail function that tracks specified log files (or specified and/or monitored events) and a send function that preferably encrypts the data, converts it to packets, and causes the packets to be sent to the OPMS receive module. The OPMS receive module also has two parts, a receive proxy that handles the decryption of the received packets, and a receive application that performs the data analysis. The OPMS Web module provides a user-friendly, web-based interface for viewing status and performance information, based upon the data analysis of the received packets.

Figure 2:
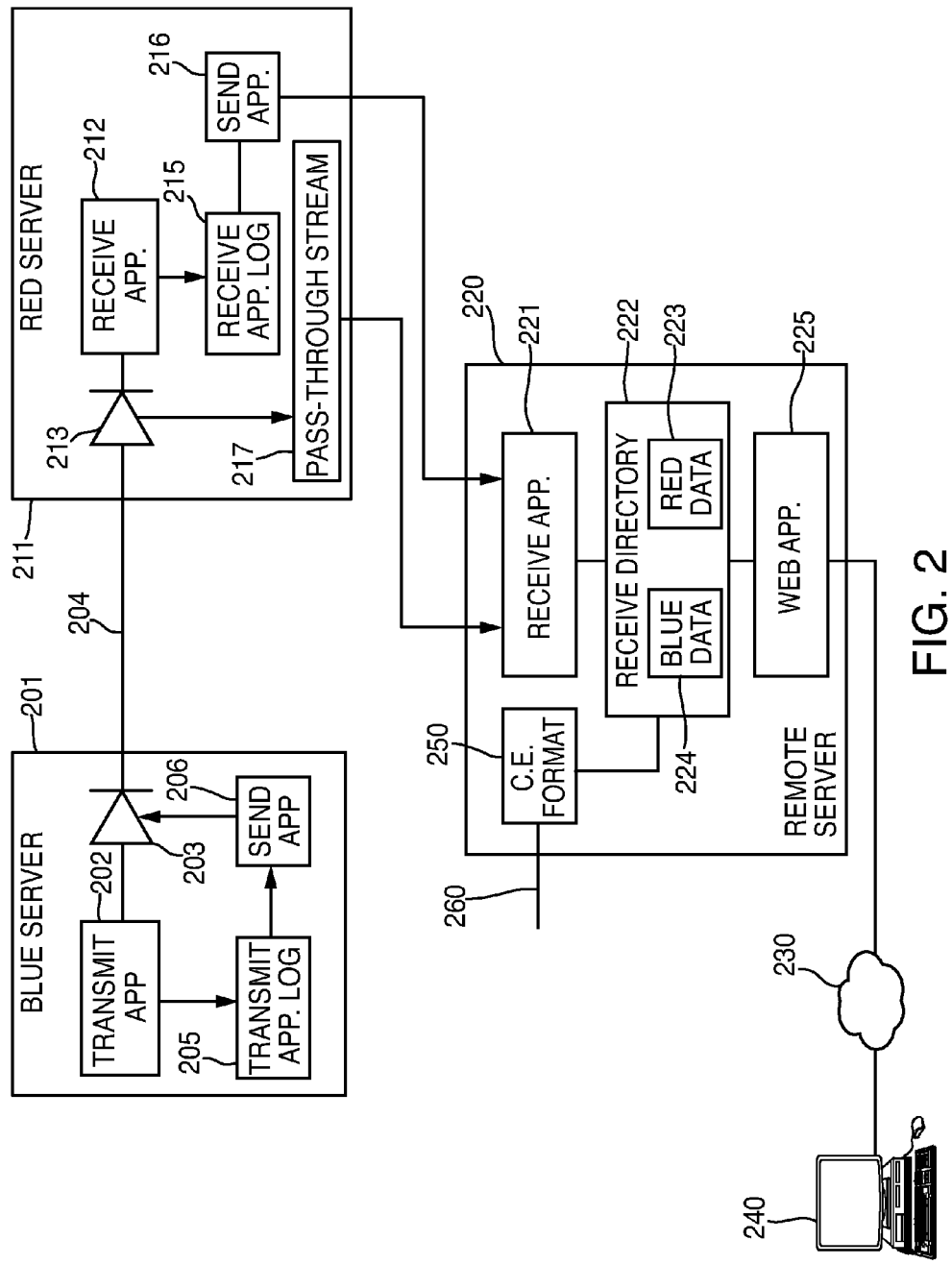
FIGS. 2 and 2A are block diagrams of embodiments of a data transmission system implementing the Owl Performance Management Service (OPMS) system used as part of the present invention.

Referring now to the drawings and in particular to FIG. 2, the present invention can be embodied in a one-way data transmission system as shown in FIG. 2 which includes a blue (transmit) server 201, a red (receive) server 211 and a remote server 220. The remote server 220 includes a web application 225 that can be accessed by a user on a computer 240 via a network 230. As discussed herein, computer 240 can be any type of computer, so long as such computer can run a compatible web browser program. Network 240 can be any type of communication network so long as computer 240 is able to communicate with remote server 230. One example network is the Internet, although more limited networks, e.g., Wide Area Networks (WANs) and Local Area Networks (LANs), may also be used as part of the present invention.

Figure 1:
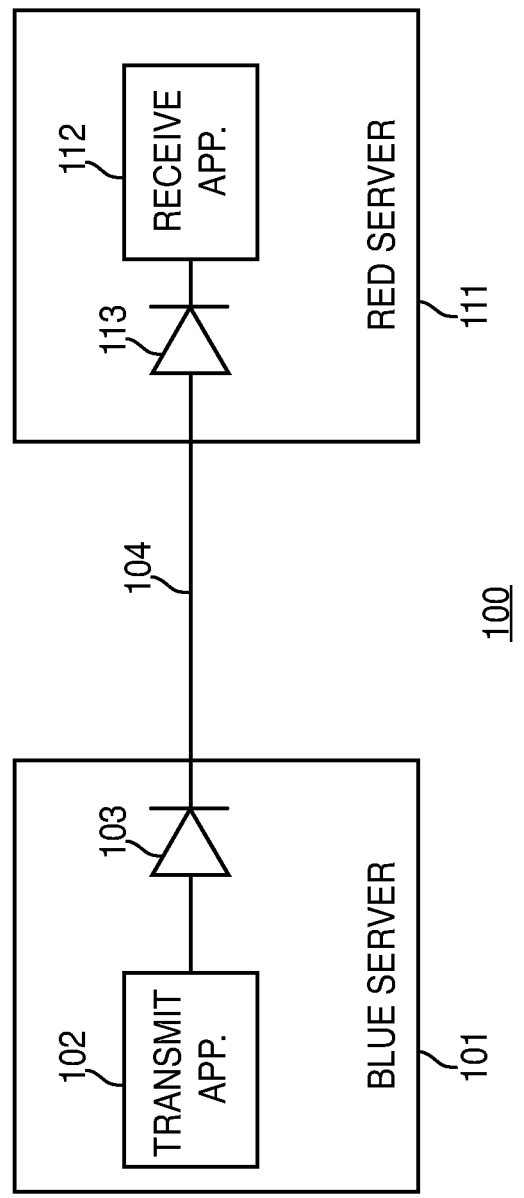
FIG. 1 is a block diagram of a conventional one-way data transfer system.

The one-way data transmission system of FIG. 2 is similar to the system of FIG. 1 (but with additional modules for implementing the OPMS system), and includes a transmit application 202 in blue server 201 for sending data across one-way data link 204 via a transmit component 203. Red server 211 includes a receive component 213, for receiving data from the data link 204 via receive component 213, which data is then provided to the receive application 212 for further processing.

The blue server 201 in FIG. 2 also includes the two parts of the OPMS send application, including the send log module 205 and the send app module 206. The send log module 205 monitors the Owl application transmit log files and/or third party application transmit log files (or other specified system events logged or identified by the operating system) via a log-tailing script that is installed and configured for each application/system to be monitored. Multiple copies of log-tailing script may be installed on a single server when more than one application is to be monitored. The send app module 206 encrypts the transmit log file and sends it to receive app 221 via transmit component 203, communication link 214 and pass-through stream 217 in the red server 211.

The red server 211 in FIG. 2 also includes the two parts of an OPMS send application, including the receive log module 215 and the send app module 216. The receive log module 215 monitors the Owl application receive log files and/or third party application receive log files (or other system events as discussed above). As discussed below, multiple instances of an OPMS send application may be installed if necessary to handle the incoming load from the associated OPMS send applications on the transmit side. The send app module 216 encrypts the receive log file and sends it to receive app 221 via a communications link, preferably a one-way communications link.

The remote server 220 in FIG. 2 includes receive app 221, receive directory 222 and web application 225. Receive app 221 is configured to receive the transmit log file from send app 206 and the receive log file from send app 216. Receive directory refers to file storage on remote server 220 and separately stores the transmit log files in the blue data section 224 and the receive log files in the red data section 223.

The OPMS Web application 225 is also installed on the web server 220 and, as discussed herein, provides, via a computer 240 coupled to remote server 220 via network 230, a user with various types of status information, including data transfer reconciliation status information (as discussed in further detail below with respect to FIGS. 26 and 27).

Remote server 220 also includes a common event format module 250 having an output 260. The Common Event Format is an open log management standard that allows for the interoperability of security-related information from different security and network devices and applications. Output 260 is an interface for connection to other devices/systems and may be any conventional type of connector/connection. Common event format module 250 processes the log files and provides common event data on output 260.

Figure 3:
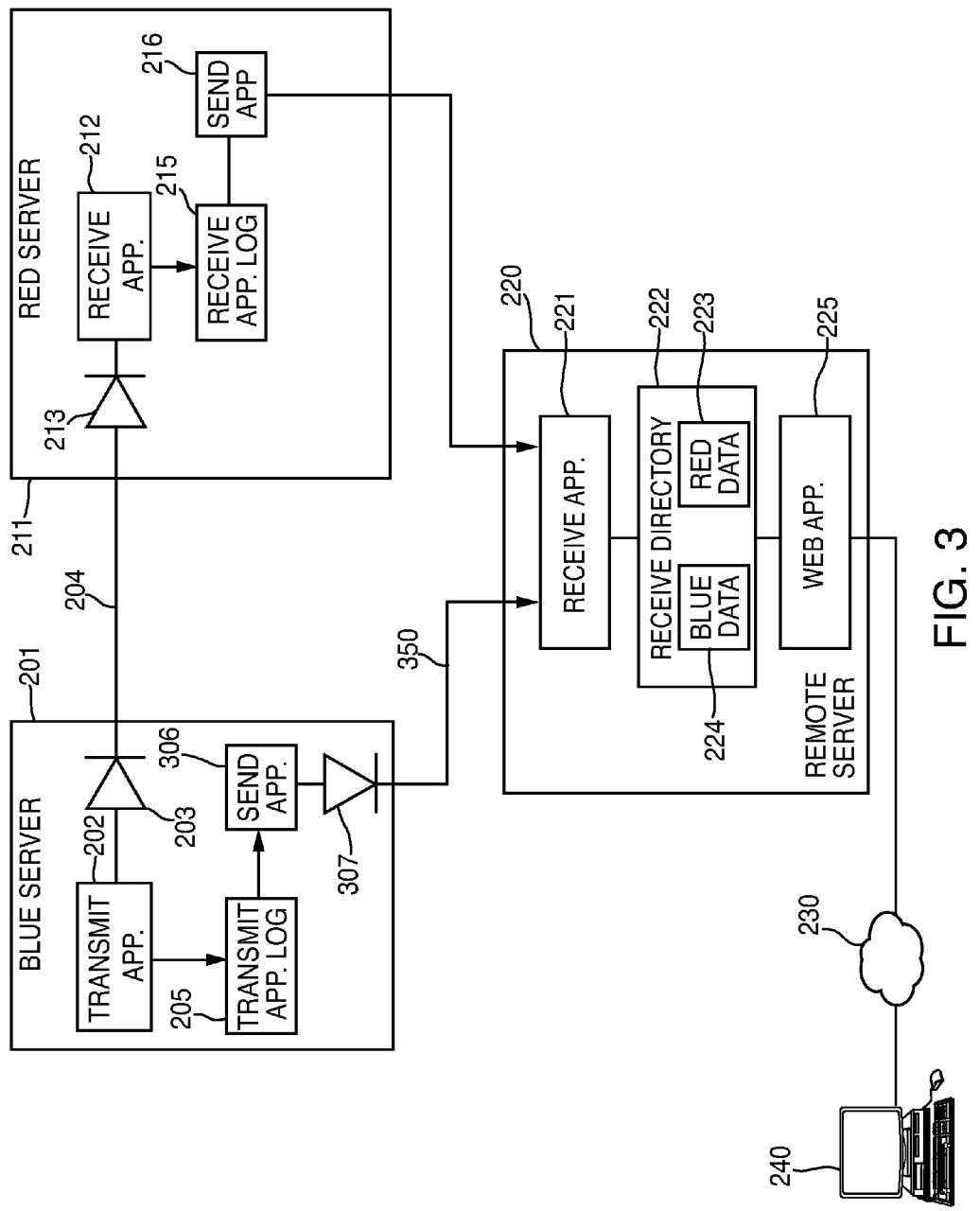
FIG. 3 is a block diagram of an alternative embodiment of a data transmission system implementing the OPMS system.

FIG. 3 shows an alternative embodiment of a data transmission system implementing the OPMS system in which the send app 306 is coupled to a separate transmit component 307 for transmitting the receive log files to the receive app 221 via a separate data link 350, which is preferably a one-way data link. As evidenced by the common reference numbers in FIG. 3, all other portions of the system shown in FIG. 3 operate in the same manner as the system of FIG. 2.

The OPMS components, i.e., the OPMS send modules; the OPMS receive module; and the OPMS web module, may be installed on hardware platforms running any one of a number of various different operating systems, including for example but not limited to Microsoft Windows®, Linux, and Solaris (SPARC and Intel), and on hardware platforms based on various computer architectures, including for example but not limited to x86, SPARC, PowerPC and Itanium.

For data security, the OPMS system preferably implements multiple methods to ensure that the log data is transferred securely to the remote server 220. For example, the OPMS send application may encrypt the log data before sending it, preferably via UDP packets, to the OPMS receive application. If OPMS receive cannot decrypt the received log data packet, it is discarded. In addition, all packets passed from OPMS send to OPMS receive may have header information added (which includes, preferably, the system name, associated application and sub-application, if any, instance, and packet sequence number). Once the packet is decrypted, the header information may be validated. The header information that identifies the sending application preferably must match the profile specified in the OPMS receive application at setup; otherwise, the packet is also discarded. Further, each packet also has a sequence number. If a packet arrives without the appropriate sequence number, it may be accepted, but the discrepancy may be recorded in the associated application's duplicate log file and highlighted in yellow when displayed via the web application window for greater visibility.

There are two types of user roles for the OPMS system, including a general user role and an administrator role, as discussed below. A general user may view OPMS screens and data, set up custom applications, set up e-mail notifications, delete custom applications, and delete e-mail notifications. The administrator has all of the general user capabilities and additionally may reset counters, add new users, delete users, delete applications from tracking and delete replicated logs.

In operation, the OPMS send module (in either the blue server 201 or the red server 211) sets up a tail on each log file to be monitored (or generates a log file based on identified system events). For each log file, the OPMS send module reads the file line by line, encrypts the data, and writes it to, preferably, UDP packets that are then sent to the OPMS receive application 221. The OPMS receive module 221 decrypts the UDP packets, parses the packet header, and checks the application and sub-application parameters against an internal list of acceptable OWL applications. If a match is not found, the OPMS receive application 221 checks a reference list of custom applications built by the OPMS Web application for a match. If the sending application is not included in either list, the packet is discarded. If it is included in one of the two lists, the OPMS receive module 221 then analyzes the packet for the performance data required and places the data in a directory (e.g., either the blue directory 224 or red directory 223 shown in FIG. 2, depending on the source) for use by the OPMS web application 225. The OPMS web application 225 creates a file containing the non-Owl applications added via the setup tab (as discussed herein with respect to FIG. 12). Once the OPMS receive application 221 processes the received log file and places the performance data (i.e., the information in the log files) into the proper receive directory, the OPMS Web application 225 reads the performance data from the receive directory, formats the performance data into charts and tables, and stores the charts and tables for display to a user via a chosen web browser.

At installation, the OPMS system must be configured by the administrator to identify the applications and log file names to be monitored. In addition, each instance of the OPMS send application is configured to specify the IP address and port used to send data to the associated OPMS receive application. Further, the OPMS receive application is configured to specify the listening port for receiving data from the OPMS send applications and to identify the location of the receive directory for storing data. Finally, the OPMS Web application is configured with the path to the monitoring data directory for the OPMS receive application.

Figure 4:
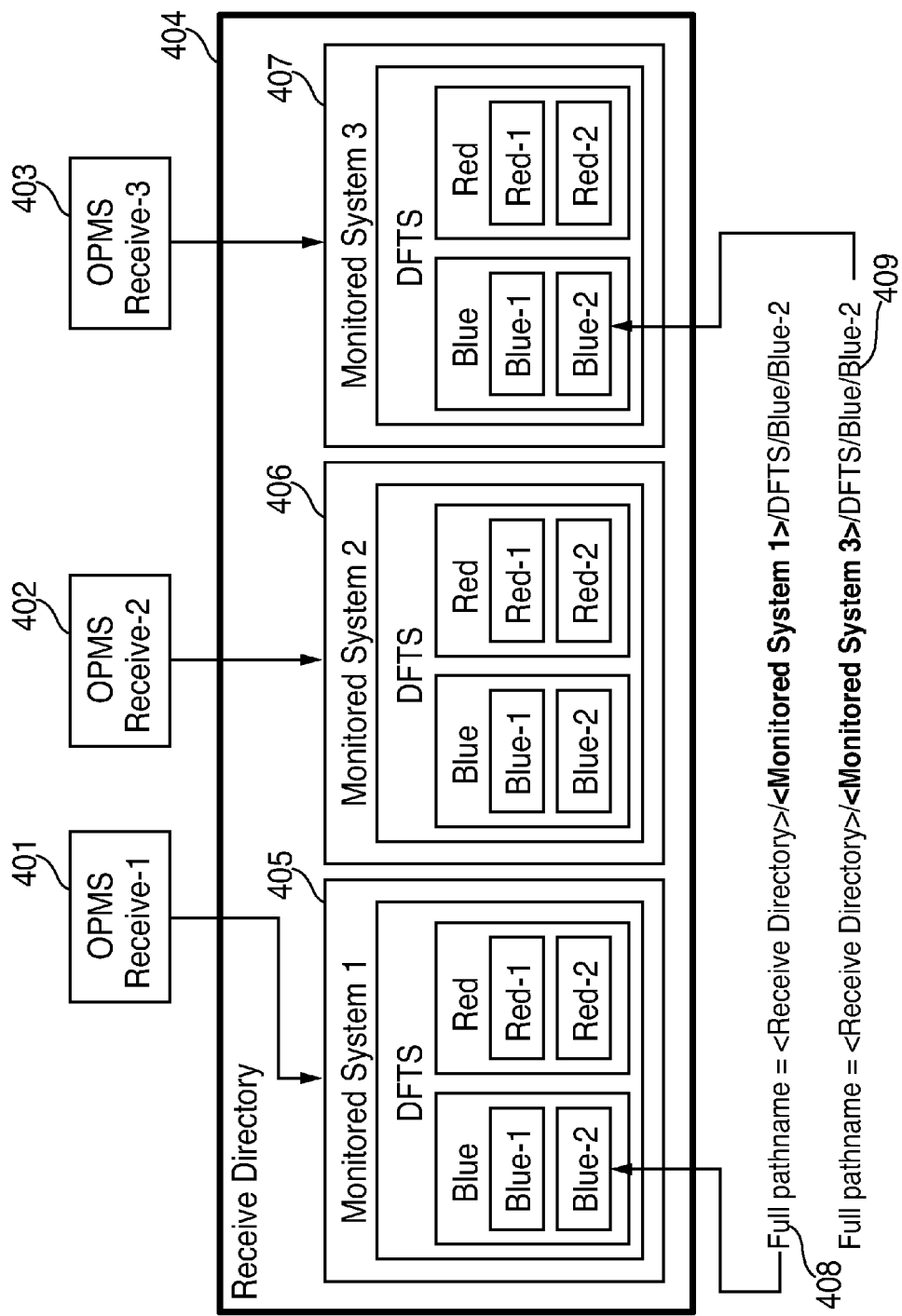
FIG. 4 is a block diagram of an enhanced embodiment of a portion of a data transmission system implementing the OPMS system.

FIG. 4 shows an example of multiple instances of an OPMS receive application 401, 402, 403 installed simultaneously on the remote server. This can be done, for example, for scalability or to accommodate data separation or isolation. Note that each copy of the OPMS receive application 401, 402, 403 must be configured to listen on a separate port and each copy of OPMS send module is directed to the associated OPMS receive application by being configured with the associated port number. All instances of the OPMS receive application download the received data to a single directory 404 to be used by the single instance of OPMS web 225; with the single directory 404 being structured based on the identification tags of the incoming data to have separate portions 405, 406, 407.

Cross domain system (CDS) monitoring may be done in various ways with the OPMS system. Typically, the location of the reporting (remote) server (i.e., the server where the OPMS receive application and the OPMS web application are installed) control the configuration to be used. One advantage in using the OPMS system in CDS monitoring is that it is safe to use across accreditation boundaries because it is a one-way system and data is only pushed out of the CDS system with no way to reach back into the CDS system through the OPMS system.

Figure 5:
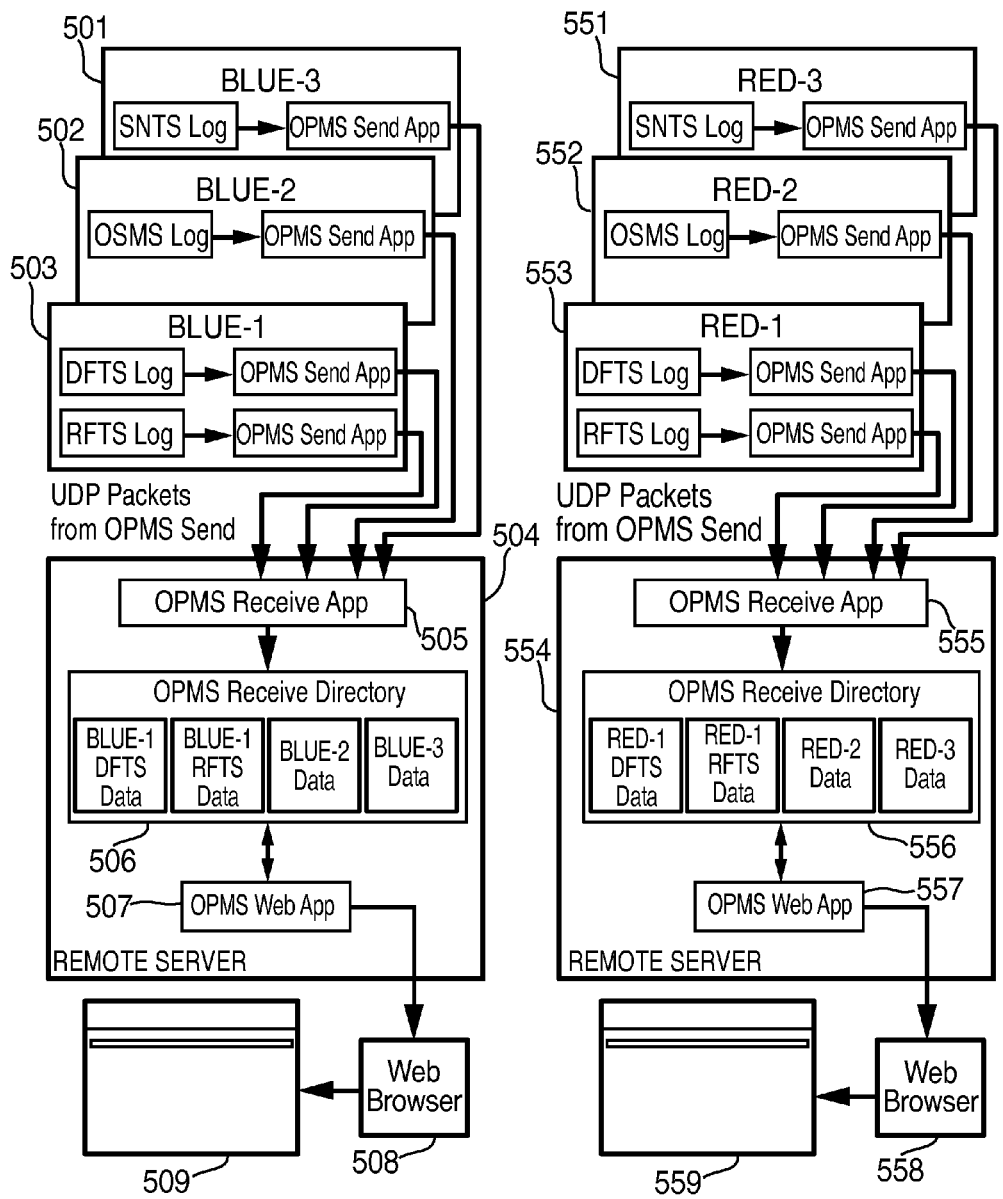
FIG. 5 is a block diagram of another alternative embodiment of a data transmission system implementing the OPMS system.

One possible configurations based on common CDS systems is shown in FIG. 5, where the send application and the receive application (i.e., each set of server platforms) are monitored separately, by reporting all send operations to one copy of the OPMS application and all receive operations to another copy of OPMS. As shown in FIG. 5, three blue servers 501, 502, 503 are coupled to the OPMS receive app 505 in remote server 504 and the three red servers 551, 552 and 553 are coupled to the OPMS receive app 555 in remote server 554. Each remote server 504, 554 includes an associated OPMS receive directory 506, 556 and OPMS web app 507, 557. The user separately accesses each OPMS web app 507, 557 through separate web browser pages 508, 558 to access respective data screens 509, 559. This setup shown in FIG. 5 is useful for total isolation of the networks, which is necessary, for example, when monitoring domains with differing levels of security so that log data from the high-security side is not visible on the low-security side of the CDS. However, one drawback is that the OPMS web browsers 508, 558 are not able to provide reconciliation data.

Figure 6:
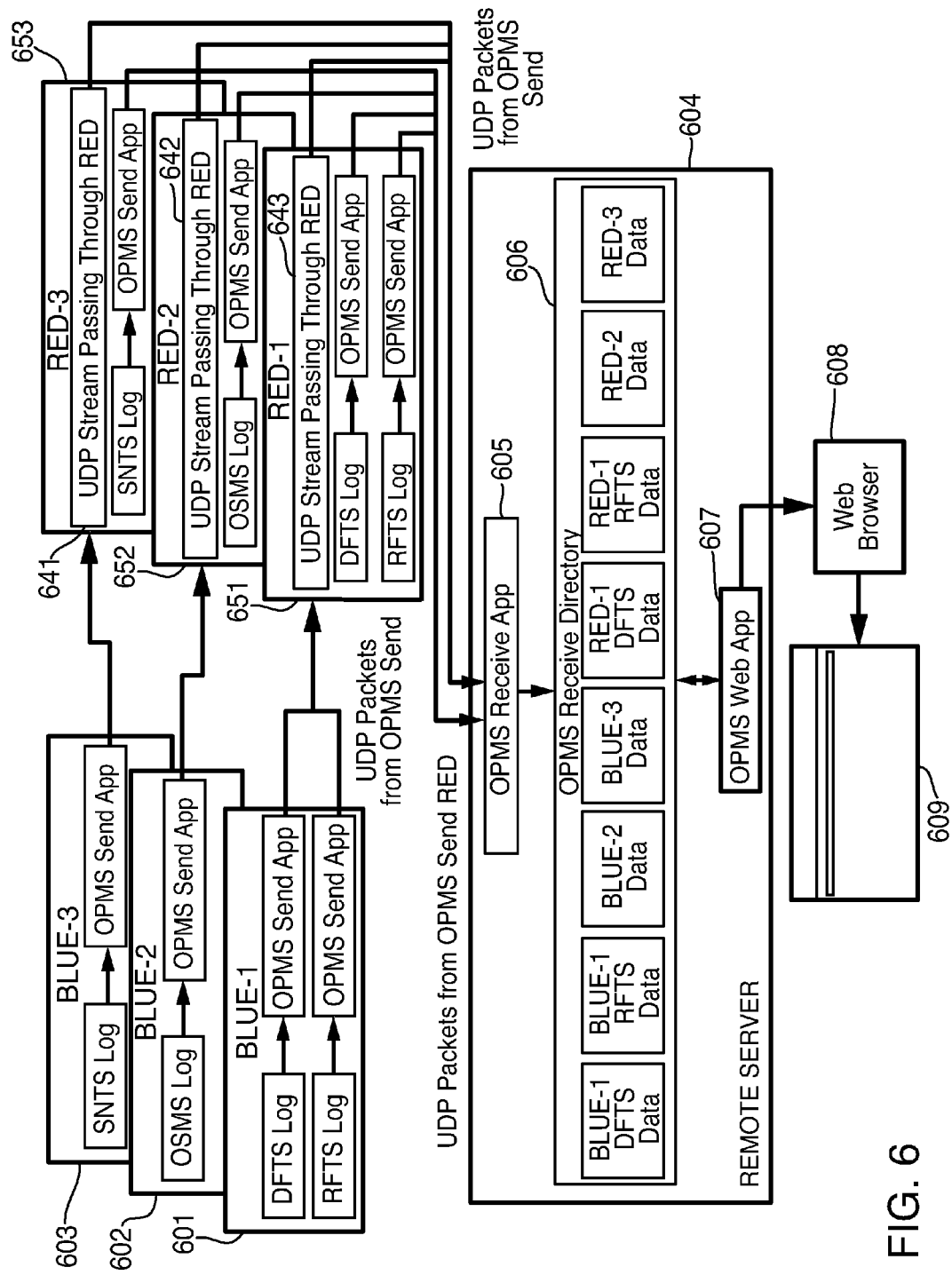
FIG. 6 is a block diagram of a further alternative embodiment of a data transmission system implementing the OPMS system.

Another possible configurations based on common CDS systems is shown in FIG. 6, where the send application and the receive application (i.e., each set of server platforms) are monitored together by channeling all log data through a single UDP port on the receive side for each send/receive server pair in the system. As shown in FIG. 6, three blue servers 601, 602, 603 are coupled to a respective UDP stream pass-through 641, 642, 643 in the respective red servers 651, 652 and 653. The red and blue packets are provided via the red servers 651, 652 and 653 to the OPMS receive app 605 in remote server 604. The single remote server 604 includes a common OPMS receive directory 606 and a single OPMS web app 607. The user accesses the single OPMS web app 607 through a web browser page 608 to access data screens 609 (which may display data red and/or blue servers). The configuration in FIG. 6 is useful for obtaining an overview of the complete CDS from a single location. All log data is available at one site, permitting easy comparison of system performance on each side of the CDS. The FIG. 6 configuration also permits secure monitoring between two different levels of security, for example, the high-security side of the CDS could monitor progress on the low-security side without being able to interfere or to view any actual data being passed. Finally, the FIG. 6 system configuration allows the OPMS web browser to provide reconciliation information according to an aspect of the present invention.

As discussed below, the OPMS system web interface provides performance data specific to the traffic on the CDS, such as number of files transferred, average rate of transfer, total number of bytes transmitted, and current transfer activity. The performance data may be displayed in the form of charts, tables and/or lists. The OPMS system web interface may also provide error tracking data, such as: diode errors, file transfer errors, total number of errors, a descriptive list of errors, and also greater detail on the errors that occur via, for example, additional web pages. Such greater detail provides assistance in diagnosing problems and in pinpointing any possible sources of the trouble within the CDS. The OPMS system web interface may highlight all lines of any duplicate logs that contain the word "error" or that have out-of-sequence packet numbers, with errors shown in red text and incorrect sequence numbers highlighted in yellow. Also, each system being tracked by OPMS has a current status display, allowing the user to see at a glance if one of the systems has any errors in its log files. In addition, a user may view detailed information for any listed individual application, both current (in real time) and as summarized (over the last ten minutes and overall), allowing the user the further ability to detect error conditions. The OPMS system web interface also allows the user to view copies of the log files for the individual applications, which can also aid in diagnosing errors and in determining solutions. These log files are provided remotely by the OPMS system web interface and thus allow the user access to these files without having direct access to the CDS servers. These log file copies are constructed from the line-by-line data collected by OPMS receive application and are not linked directly to the log files in the source directories. This ensures that the source log files cannot be corrupted in any way through the OPMS system. The OPMS system web interface also allows the user to view the archived copies of the log files.

Although FIGS. 2 and 3 show the OPMS system in the context of a one-way data transfer system, one of ordinary skill in the art will readily recognize that the OPMS system may be used for tracking purposes on systems which allow two-way data transfer as well. However, significant hardening of network security may be achieved by separating the inter-network or inter-domain communications into one-way data transfers. In particular, one-way data transfers support the confidentiality of the high-security domain while transferring data to (read-up) or from (read-down) that domain. Among other advantages, one-way data transfers deny the possibility of network probing for vulnerability, a prelude for most cyber-attacks. Intelligent utilization of one-way data transfers also simplifies creation of data archives whose contents cannot be deleted, corrupted, or repudiated. One-way data transfer systems, such as Owl's DualDiode data transfer system disclosed in U.S. Pat. No. 8,068,415, provide a unidirectional optical fiber connection between networks using Asynchronous Transfer Mode (ATM) communication hardware that transfers data at high throughput rates with high quality of service. The Owl DualDiode data transfer system consists of two communication cards or devices, one for sending data and the other for receiving data. When the two communication cards are installed in separate host platforms, they become the BLUE send-only server 101 and the RED receive-only server 111 for the networks to which they are connected, as shown in FIG. 1. An optical fiber 104 connects the BLUE and RED servers 101, 111. Security for the one-way transfer is enforced in hardware at both the Send and Receive servers 101, 111, creating a secure "DualDiode" configuration so that no mitigating firewall is required between the Send and Receive servers 101, 111. One of ordinary skill in the art will readily recognize that a firewall or additional security features may also be installed in the systems shown in any of the figures herein.

As shown in FIG. 2, the OPMS system can be used to monitoring both sides of a one-way (e.g., DualDiode) transfer system from the red server 211 side. In this embodiment, the log file data from the blue sever is sent across the one-way data link 204 to the red server, either on an available UDP port (if using a multichannel card) or via a MUX/DEMUX application. The blue log file data does not interact in any way with the red server 211 but merely passes through to reach the same output port that the red server 211 uses to send the red log file data to the OPMS receive application 221.

Figure 7:
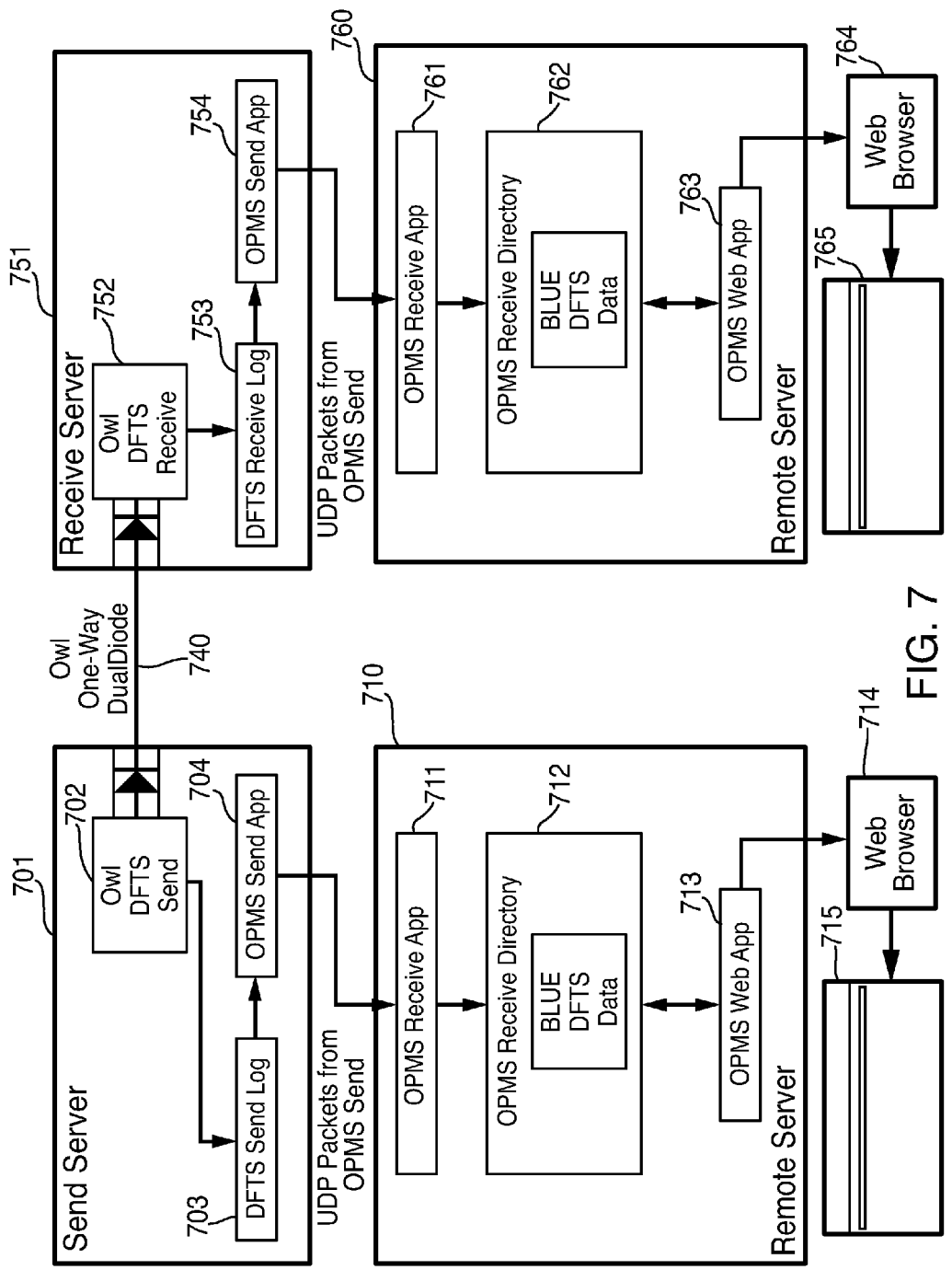
FIG. 7 is a block diagram of a still further alternative embodiment of a data transmission system implementing the OPMS system.

In an alternative embodiment shown in FIG. 7, the OPMS system can be set up to monitor each side of a one-way (e.g., DualDiode) transfer system separately. In that case, two OPMS systems must be installed, one on each server (i.e., blue server 701 and red server 751). The blue server 701 includes a transmit application 702 (here an Owl DFTS send module), a DFTS send log 703 and an OPMS send application 704. The red server 751 includes a receive application 752 (here an Owl DFTS receive module), a DFTS receive log 753 and an OPMS send application 754. A one-way communications link 740 is coupled between the transmit application 702 and the receive application 752. A first remote server 710 includes an OPMS receive application 711, an OPMS receive directory 712 and an OPMS web server 713. A second remote server 760 includes an OPMS receive application 761, an OPMS receive directory 762 and an OPMS web server 763. A remote user can access the OPMS information screens 715, 765 on different windows of a single web browser or separately using separate web browsers 714, 764.

The OPMS system can process logs created on the BLUE Send-only platform or the RED Receive-only platform, or logs produced by other Owl applications running on different host systems (e.g., RFTS Client and Server). The OPMS system can also process logs for other, non-Owl applications that produce log files. The OPMS send application must be installed wherever those log files are stored; they need not be on the same servers as the Owl applications.

Currently, the OPMS system supports the ability to monitor logs created by Owl products and by third-party products. For example, current Owl products include: Owl Secure Directory File Transfer System (DFTS), Owl Remote File Transfer Service (RFTS), Owl ScanFile Management System (OSMS), Owl UDP Packet Transfer System (UPTS), Owl MUX/DEMUX server application for unicast, multicast, and broadcast distribution (applies to UPTS and SNTS), Owl TCP Packet Transfer System (TPTS), and Owl Secure Network Transfer System (SNTS). Examples of third-party products include: Audit Logs Syslogs, and Windows Event Logs. These non-Owl log files are added to OPMS using the Setup tab from the main dashboard (as discussed in detail below).

Figure 2A:
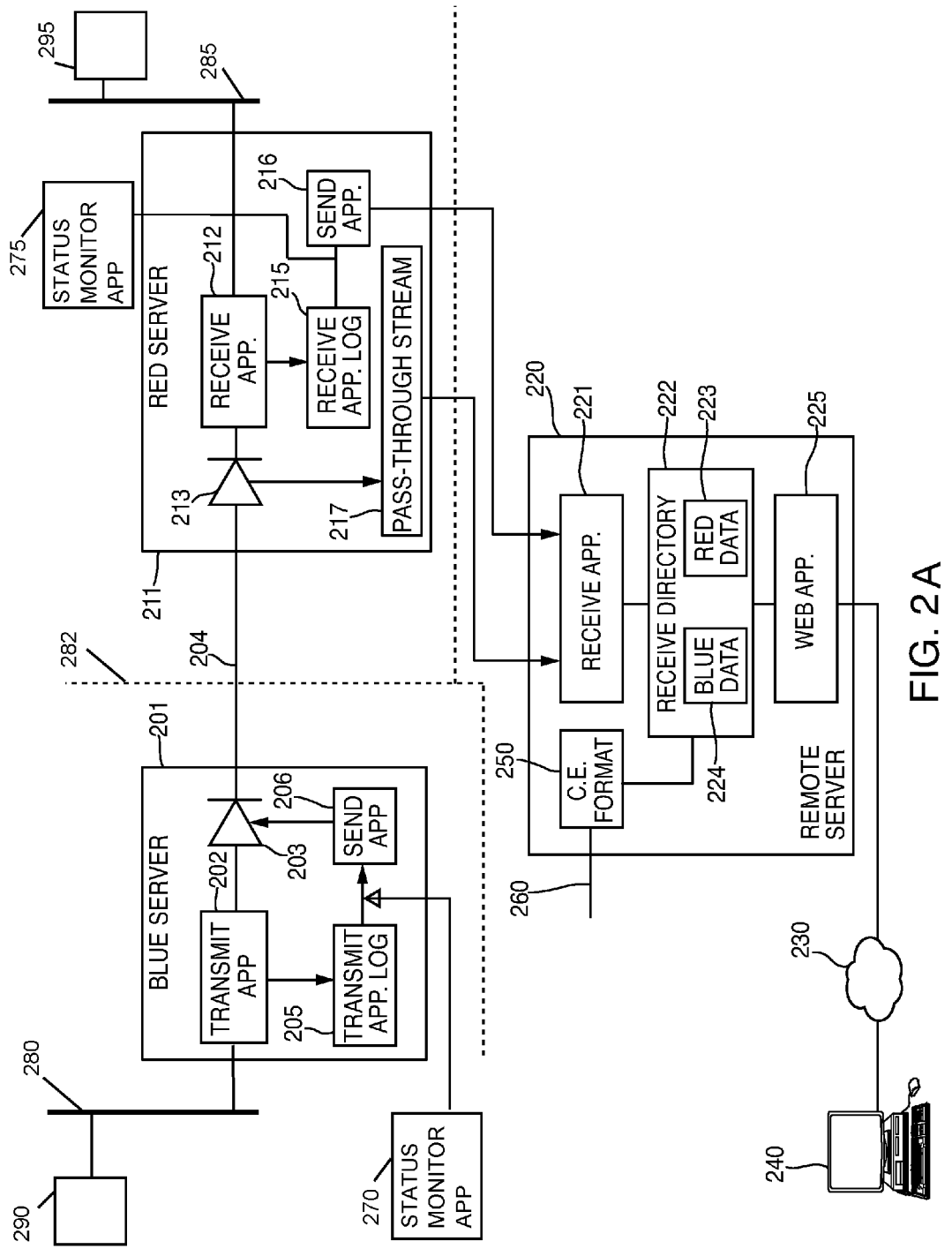

In a further embodiment, as shown in FIG. 2A, a status monitoring application 270, associated with the blue server 201 and a network 280 coupled thereto, may provide an additional log file (or an addendum for an existing log file) for transmission to OPMS receive application 221 on remote server 220. Blue server 201 and the associated network 280 (and any other devices 290 coupled to network 280) may be positioned within a first security domain, e.g., as shown by the area above and to the left of dotted line 282. In addition or in the alternative, a status monitoring application 275, associated with the red server 211 and a network 285 coupled thereto, may also provide an additional log file (or an addendum for an existing log file) for transmission to OPMS receive application 221. Red server 211 and the associated network 285 (and any other devices 295 coupled to network 285) may be positioned within a second security domain, e.g., as shown by the area above and to the right of dotted line 282. The second security domain may be different than the first security domain. Remote server 220 may be positioned within a third security domain, e.g., as shown by the area below line 282 in FIG. 2A, or within one of the first and second security domains. Status monitoring application 270 may provide, via the associated log file (or log file addendum), information about status of blue server 201, network 280 and/or of any computer coupled to network 280 (e.g., computer 290). Status monitoring application 275 may provide, via the associated log file (or log file addendum), information about status of red server 211, network 285 and/or of any computer coupled to network 285 (e.g., computer 295) based on system monitoring information, for example.

The status information included in the log files provided by status monitoring applications 270, 275 of FIG. 2A can include information pertaining to network traffic (e.g., the number and/or type of devices connected thereto). In addition, the status information may include more detailed information about the status of each device coupled to the associated network 280, 285 (including but not limited to blue server 201 and red server 211, respectively). In this manner, the OPMS system can identify undesirable events occurring with any device associated with either network 280 and/or network 285 in real-time. For example, in certain circumstances the first security domain and/or the second security domain may restrict the use of removable storage devices on any device coupled to the first network or the second network, respectively. Thus, for a network banning the use of removable storage devices, the status information may thus include information about whether any removable storage devices are currently mounted on any of the devices, e.g., on computers 290, 295, the presence of such devices constituting a security violation. Other types of activities that may be considered a security violation include: (a) when particular users log on, (b) when any or particular types of USB devices are plugged in, (c) when the system time is changed, (d) when a user password is changes and (e) credential changes. However, it is to be understood that these examples are merely exemplary and that the present system may be used to identify any type of activity which is tracked by the associated system (e.g., information within the Microsoft Windows Event Log). One particular advantage of this system is that security violations are immediately forwarded out of the secure network in real-time, upon detection and logging, and thus any malicious action that occurs cannot be covered up.

The OPMS system can be configured, in the manner described in detail below, to monitor the log files provided by status monitor applications 270, 275 to the OPMS receive application 221 to identify any predetermined security violation in real-time, including but not limited to the presence of a removable storage device, and flag the predetermined security violation as an error. The status monitoring applications 270, 275 may be added to each of the embodiments of the OPMS system disclosed herein in a similar manner.

As discussed above, operating systems running on computing systems and other devices typically track and generate log messages that provide information about the current status of the computing system, and such messages are stored in a log (e.g., the Windows Event Log for Microsoft Windows®). Depending on the environment in which a particular computing system is installed, certain of the log messages included within the Windows Event Log (or equivalent for other operating systems) may constitute a security violation or other event that should be monitored. In some instances, e.g., in the case of regulatory requirements requiring tracking of all system events, it may be desirable to remotely replicate a log file of all system events that occur in a monitored system using the present system. For example, the present system may be used to create a remote log file of all system events identified within the Windows Event Log at the remote server running the OPMS receive application that occur over a fixed period of time. For example, in two still further alternative embodiments shown in FIGS. 28A and 28B, one or more devices 2801a, 2801b, 2801c are coupled to a common network 2804. Each of the devices includes an OPMS send application consisting of a monitor application 2803a, 2803b, 2803c and a transmit application 2802a, 2802b, 2802c. The monitor application 2803a, 2803b, 2803c monitors the Windows Event Log (or equivalent for other operating systems), captures each new event and converts the event to an alert message format (e.g., Syslog), and then converts the alert message format message into a UDP packet-based message. The UDP packet-based message is provided to the associated transmit application 2802a, 2802b, 2802c that is coupled to network 2804.

Figure 28A:
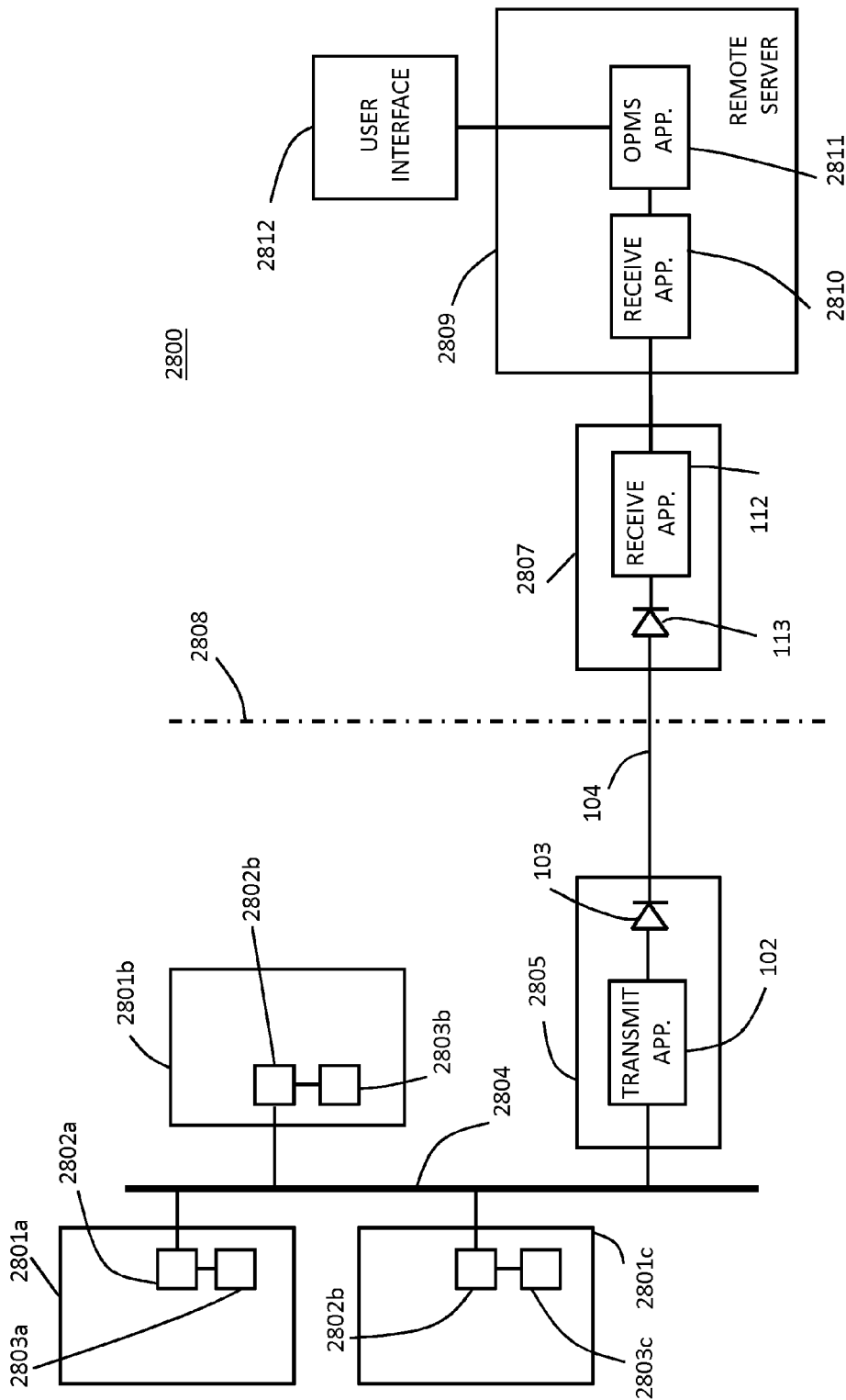
FIGS. 28A and 28B are block diagrams of an alternative preferred embodiment of an implementation of the OPMS system.

In the system 2800 shown in FIG. 28A, transmit applications 2802a, 2802b, 2802c communicate with a transmit application 102 via network 2804. The transmit application 102 receives packets from one of the transmit applications 2802a, 2802b, 2802c and forwards them to receive application 112 via a one-way link comprising, for example, optical emitter 103, optical fiber 104, and optical detector 113 (as in FIG. 1). As one of ordinary skill in the art will readily recognize, other types of one-way links may be used to couple transmit application 102 to receive application 112. Receive application 112 forwards the received packets to the OPMS receive application 2810 in a remote server 2809. The OPMS receive application 2810 passes the received packets to an OPMS application 2811 for processing. For example, OPMS application 2811 may be configured via user interface 2812 to monitor the received packets to identify particular keywords, e.g., keywords relating to the mounting of a removable storage device or to a failed log-in attempt. In addition, as discussed below, the OPMS system (here application 2811) may be configured to identify any message using a particular word or phrase. Thus, for example, OPMS application 2811 may be configured to identify each event which includes the word "error." When such events are identified, OPMS application 2811 may also be configured to generate a user alert. In another example, OPMS application 2811 may be configured to store all packets within a log file associated with the originating device that occur over a fixed period of time, e.g., storing all system events (or a predetermined subset thereof) in a series of recurring daily log files to automatically satisfy regulatory requirements for monitoring of all events that occur on a particular device. The system shown in FIG. 28A provides a way to monitor status of devices 2801a, 2801b, 2801c coupled to a network 2804 that are all position within a secure domain (the area to the left of the dotted line 2808) via a remote server 2809 located outside the secure domain (the area to the right of the dotted line 2808) without allowing remote server 2809 with the ability to transmit any information/data whatsoever to any device coupled to the network 2804 within the secure domain—maintaining the security of such network.

Figure 28B:
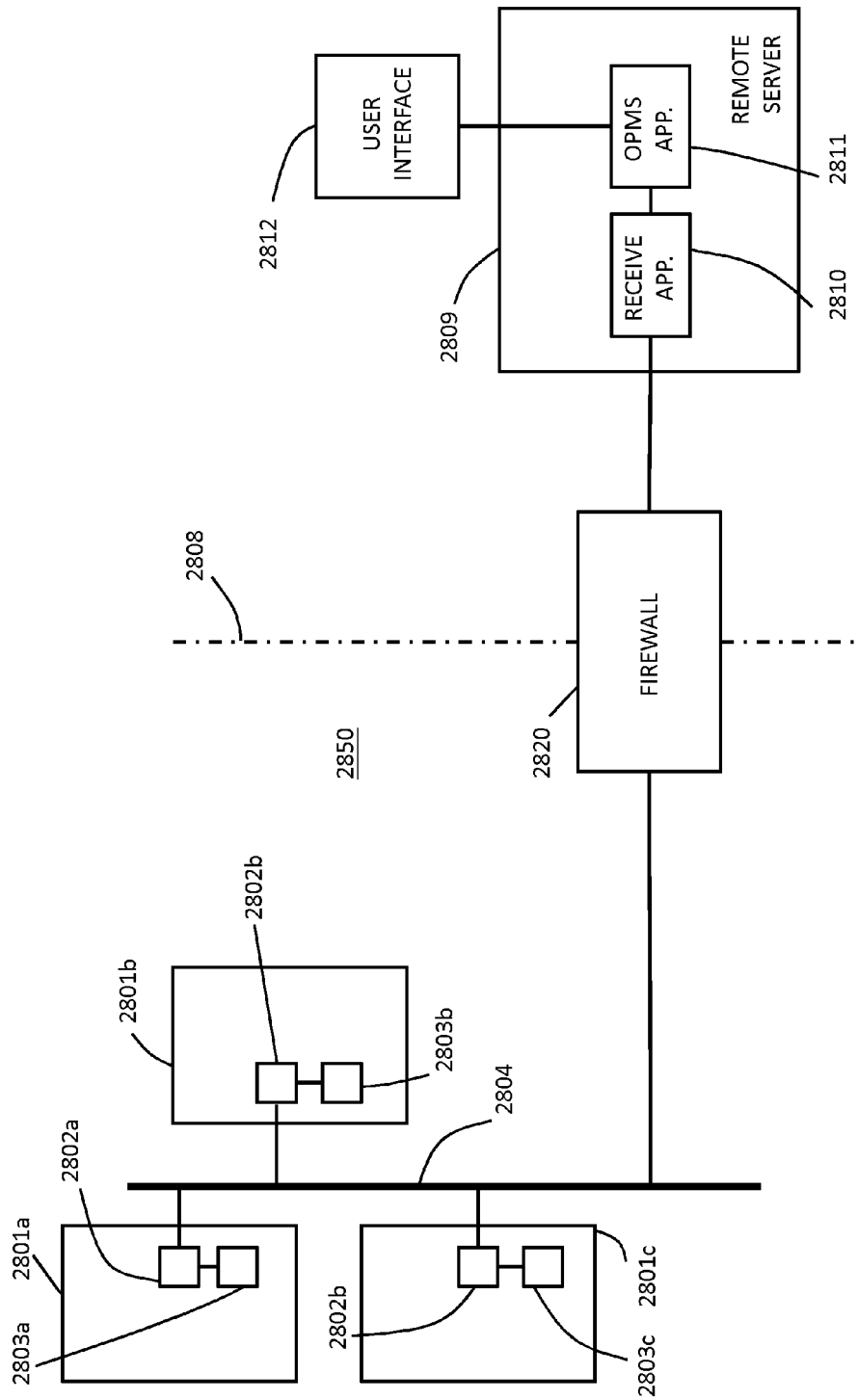

In the alternative system 2850 shown in FIG. 28B, transmit applications 2802a, 2802b, 2802c communicate directly with the receive application 2810 in remote server 2809 via a firewall 2820, instead of via a one-way interface. Firewall 2820 is configured with a single port open allowing communications to receive application 2810, but not allowing receive application 2810 to communicate with any device coupled to network 2804. System 2850 otherwise operates in the same manner as system 2800 to remotely monitor the status of the devices 2801a, 2801b, 2801c. The use of the one-way link in FIG. 28A and the firewall 2820 in FIG. 28B ensures that the monitoring information is transmitted outside the domain of the monitored network in real-time and into a domain protected from any malicious activity occurring within the monitored network domain.

The Owl Secure Directory File Transfer System (DFTS) is based on Owl DualDiode Technology® and is designed to transfer directory structures and files between two platforms via the paired ATM communication cards of the DualDiode. The DFTS application produces log files on both sides of the process. The DFTS Send log records the following information for each file transferred: file name, file size (in bytes), time to send (in seconds), rate of transfer (in megabytes per second), number of Owl packets for transfer, and date and time of transfer. The DFTS Receive log records the following information for each file received: file name, file size (in bytes), time to receive the file, rate of transfer (in megabytes per second), whether the file passed the MD5 check (the MD5 value is transmitted in the header information of the sending Owl packets and must equal the MD5 value received or the file will be discarded), and date and time of receipt. Since DFTS is based on the DualDiode, the OPMS system can also report some data related to the DualDiode's functioning, e.g., it can determine how much of the DualDiode's capacity is being utilized.

Figure 19:
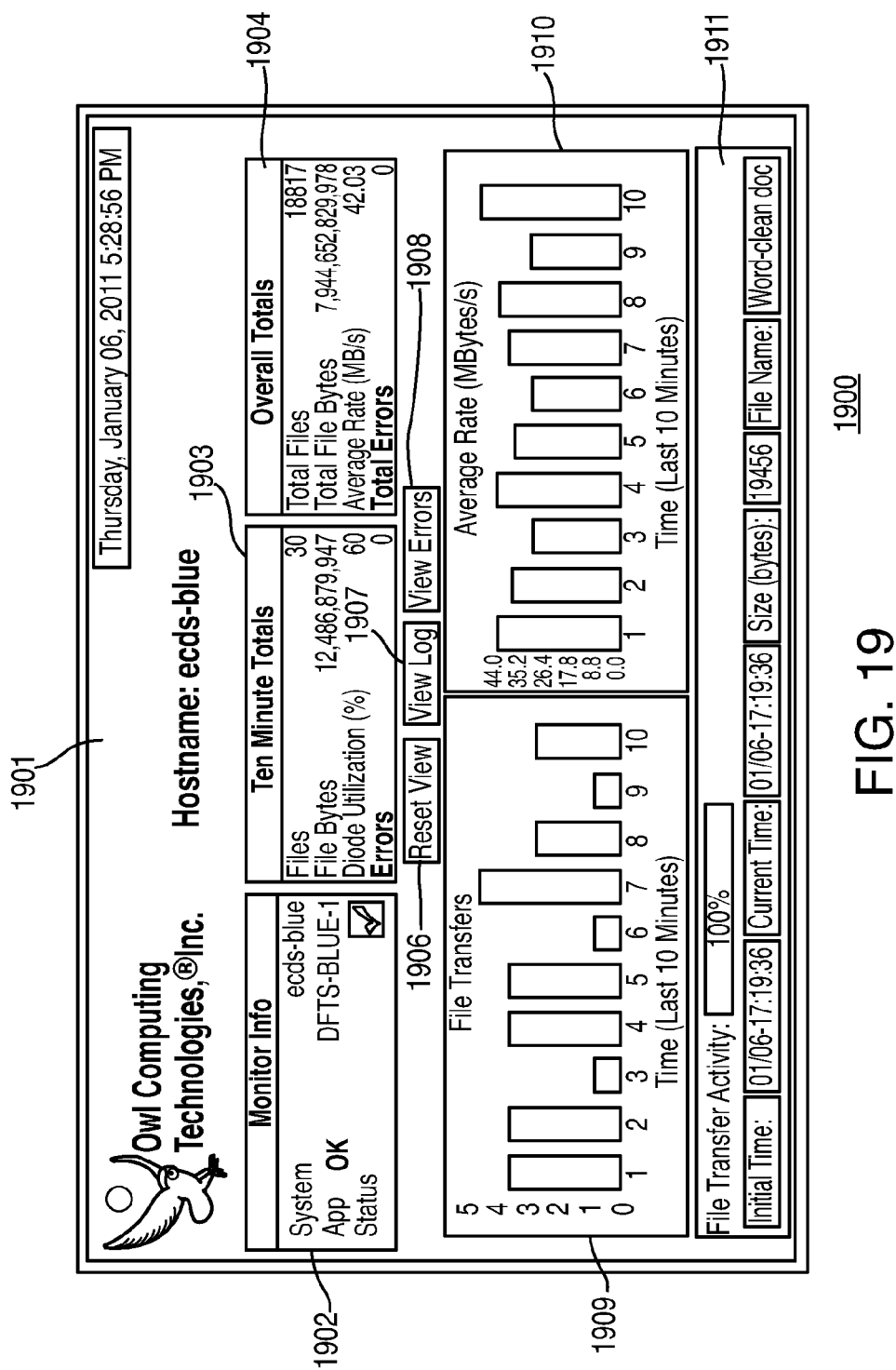
FIG. 19 is a screen shot of the OPMS web server browser window showing the detailed status page for a monitored file transfer application.

The Owl Remote File Transfer Service (RFTS) is a software package that transfers directory structures and files from one network storage location to another via TCP/IP packets. It may incorporate file scanning and filtering scripts at either or both sides of the transfer. RFTS produces log files on both sides of the application. RFTS complements network security policies where protocols such as FTP and NFS are disallowed because RFTS employs a single, configurable TCP socket using IP filtering, traffic flow management, and advanced encryption and authentication techniques to keep data secure. RFTS Client and Server communicate via an SSL encrypted session. The RFTS Server is also capable of source authentication and will only accept data from the RFTS Clients listed in its configuration file. The RFTS Send log records the following information for each file sent: file name, file size (in bytes), IP address of the socket connected to the RFTS Client, port number of that socket, whether or not that socket accepted the connection, number of Owl packets, time to send the file (in seconds), rate of transmission (in megabytes per second), and date and time of file transfer. The RFTS Receive log records the following information for each file received: file name, file size (in bytes), IP address of the originating socket, port number of that socket, port number that the file is to be sent to on the Receive platform (final destination), time to receive the file (in seconds), rate of transmission (in megabytes per second), and date and time of transfer. In addition to the sent and received data, the OPMS application monitors the TCP connections within the RFTS application. The OPMS display includes a table detailing the following for each active transfer session: the IP address originating the data, the port being used to receive the data, session and channel counts, and total bytes transferred during that session. The table will include all connected sessions within the immediately preceding ten minutes, whether the sessions are still active. Currently-active sessions will be highlighted, as shown below for Port 2502 in FIG. 19. FIG. 19 shows an example of the OPMS system monitoring the Receive (Server) side of the second instance of an RFTS application.

The Owl ScanFile Management System (OSMS) is an extension of the DFTS product, adding file type filtering and virus scanning capability. Like the DFTS, the OSMS is based on Owl DualDiode Technology®. It is designed to transfer directory structures and files between two platforms via the paired ATM communication cards of the DualDiode. OSMS provides the ability to scan the transferred files for viruses and/or file type. This scanning can be accomplished before and/or after transfer across the DualDiode. OSMS uses the same log file setup as DFTS for Send and Receive logs.

The Owl UDP Packet Transfer System (UPTS) transfers UDP traffic (such as streaming video) between two servers on discrete networks. It may be augmented with the Owl MUX/DEMUX Server application for unicast, multicast, or broadcast distribution. The UPTS BLUE-RED applications are provided, in their basic form, as a single-port proxy service. Using the single-port architecture, all UDP traffic (from one or many sources) is transmitted to a single listening port on BLUE. BLUE passes the data to RED. RED delivers the traffic to a single IP Port final destination. UPTS also supports synchronization of multiple UDP streams as separate UDP sessions with the multi-port proxy service. Multi-port UDP synchronization is achieved by extending the basic single-port UPTS capability with multiplexing software (MUX/DEMUX). Special handling of syslog messages is also achieved with a MUX software variant. UPTS can also be set up without a DualDiode. The MUX application can be configured to communicate directly with the DEMUX application without an intervening traversal of the BLUE-RED DualDiode applications. OPMS monitors the following UPTS log files: Send and Receive operations and MUX/DEMUX application Send and Receive sides (if applicable).

The Owl TCP Packet Transfer System (TPTS) transfers TCP/IP socket-based information. It moves one-way TCP data streams and provides support for the following Owl products: Remote File Transfer Service (RFTS) and Remote Printing Transfer Service (RPTS). TPTS requires the DualDiode to operate. In operation, a TCP/IP client program connects to Owl's BLUE platform, which operates as a TCP/IP server. The BLUE platform accepts the client's socket connection after applying user-defined IP filtering rules, and all data transferred to the BLUE platform is relayed over the DualDiode. The Owl RED platform operates as a TCP/IP client and requests a socket connection to the destination server. All data relayed over the DualDiode is then transferred to the destination machine over a TCP/IP socket. Closing the socket on the BLUE side will automatically close the socket on the RED side. TPTS produces log files on both sides of the application (BLUE and RED). Since it is based on the DualDiode, its logs contain similar information to the DFTS application.

The Owl Secure Network Transfer System (SNTS) implements IP socket-based software on both ends of the one-way link, providing seamless connectivity and easy integration of the secure DualDiode data transfer system into standard networks. SNTS supports two protocols as user interfaces to the one-way system: Transmission Control Protocol/Internet Protocol (TCP/IP) and User Datagram Protocol (UDP). SNTS may be configured for concurrent transfer of both protocol types, allowing simultaneous transfer of files, video streams, syslog messages, and any other data type that may be rendered in TCP or UDP packets. SNTS can also serve as a printer proxy server for delivering print jobs from the BLUE side to a network printer on the RED side. SNTS is a combination of the UPTS, TPTS, and RFTS products. It may also be augmented by the MUX/DEMUX application. OPMS monitors the following SNTS log files: Send and Receive operations and MUX/DEMUX application Send and Receive sides (if applicable).

The Owl Multiplexing/Demultiplexing MUX/DEMUX Server application is a supplemental application that extends the capabilities of Owl applications that transfer UDP packets (UPTS and SNTS). Production environments that require multiple UDP sessions require multiplexing (MUX) and demultiplexing (DEMUX) of messages to ensure that messages received on the BLUE side can be properly directed to their final destinations on the RED side. This is accomplished using multi-port architecture. The MUX application, executed on the BLUE side, acts as preprocessor of the received UDP traffic, passing the UDP data to the single-port BLUE application. The MUX application assigns a "Channel ID" for each listening port and adds a special header to each UDP packet before passing the packet on to the BLUE application. The companion DEMUX application, executed on the RED side, acts as a post-processor of the UDP traffic, receiving the traffic from the single-port RED application. The DEMUX application strips off the MUX header information, converts the MUX-assigned "Channel ID" into a final destination (using a user-defined configuration file), and sends the original UDP datagram to one or more final destinations. The MUX/DEMUX application produces logs on both sides, the Send (MUX) application and the Receive (DEMUX) application. These logs will appear in the log file directory of whichever application the MUX/DEMUX application is augmenting (UPTS or SNTS). Each instance of MUX and DEMUX requires a separate installation of the OPMS send log tailing component.

One copy of OPMS send is installed on each server containing one or more applications to be monitored (Owl or non-Owl). For example, to monitor the Owl DFTS application on both sides of a DualDiode, one copy of OPMS send is installed on the DFTS BLUE server and another copy is installed on the DFTS RED server. To track one side, only one copy of OPMS send is needed. If there are multiple monitored applications running on a single server (for instance, RFTS Server and DFTS BLUE), multiple copies of the OPMS send log tailing script must be installed and each copy configured for each log to be monitored on that server (in the example, one for RFTS Server and one for DFTS BLUE).

Only one copy of OPMS receive is required at the Receive and Web Location, but multiple instances of OPMS receive can be used to improve performance, if there is a large number of applications being monitored. OPMS receive is installed on a separate server at a remote location (outside the CDS). If multiple instances of OPMS receive are being used, all instances must be installed on the same remote server. OPMS Web is installed on the same server as OPMS receive.

The OPMS web browser used to view the OPMS web data can be installed on a separate platform from the rest of the OPMS components, as long as that platform has access to the OPMS receive/web server via an appropriate network connection.

Figure 8:
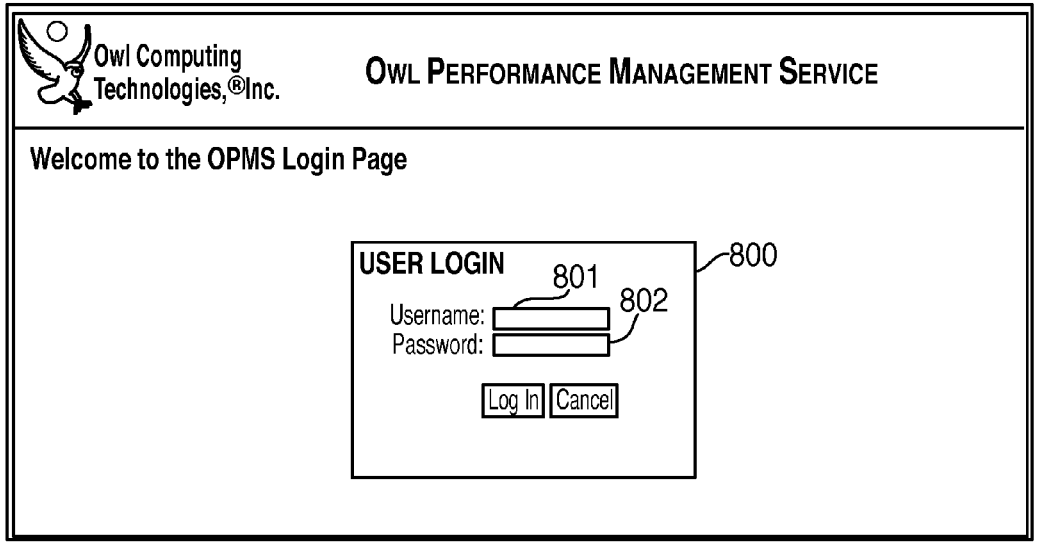
FIG. 8 is a screen shot of the OPMS web server browser window login page.
Figure 9:
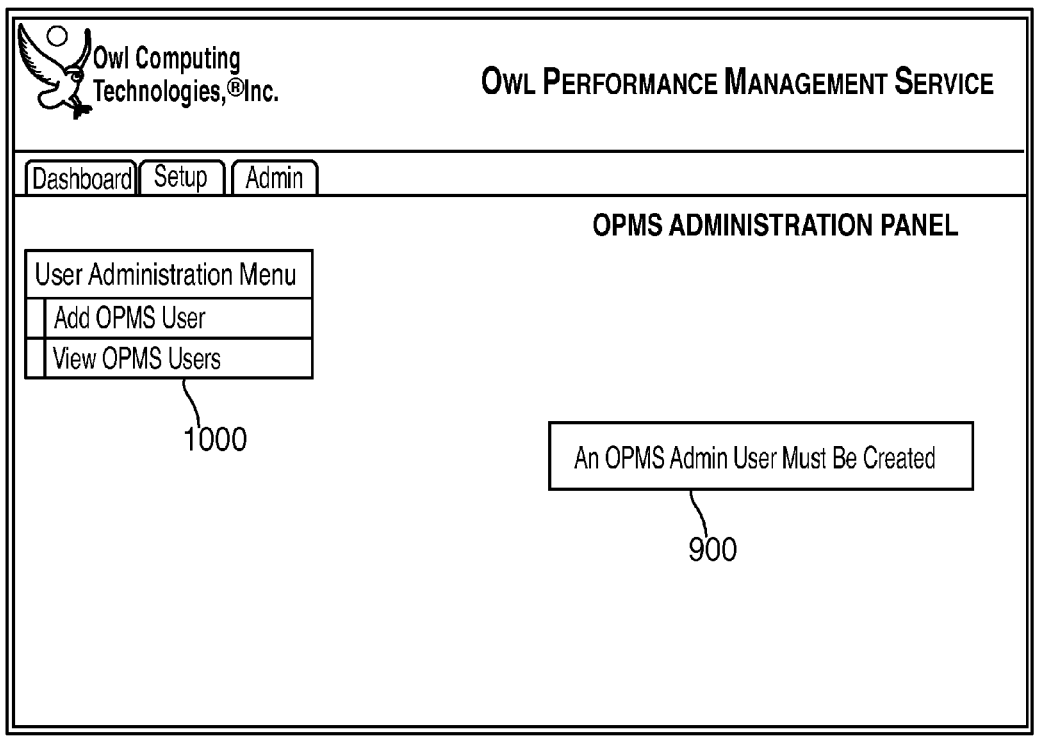
FIG. 9 is a screen shot of the OPMS web server browser window administrative panel.
Figure 10:
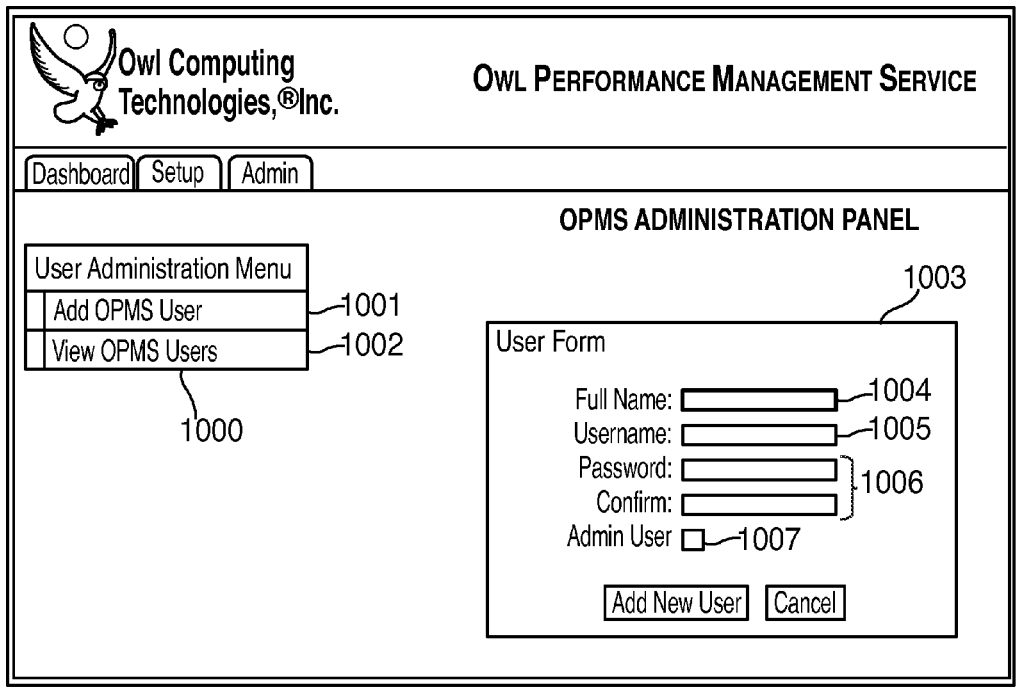
FIG. 10 is a screen shot of the OPMS web server browser window user entry form for the OPMS administrative panel.

FIG. 8 shows the initial OPMS login screen 800. The user must enter a valid username 801 and password 802 to access the OPMS system. Preferably, the OPMS system is setup so that the first time a user logs on, the screen shown in FIG. 9 will appear, with a message 900 directing that an administrator ID be created. IDs are created via the administrator menu 1000 (FIGS. 9 and 10) by selecting the add OPMS user button 1001, which provides form 1003 shown in FIG. 10. The administrator completes the name 1005, username 1005, password 1006 fields, and optionally selects the administrator user button 1007 to create each ID. A list of current OPMS users can be accessed by clicking on the view OPMS users button 1002 in the administrator menu 1000. The OPMS system is configured to sanitize and/or validate user input fields to prevent the entry of incorrect information.

Figure 11:
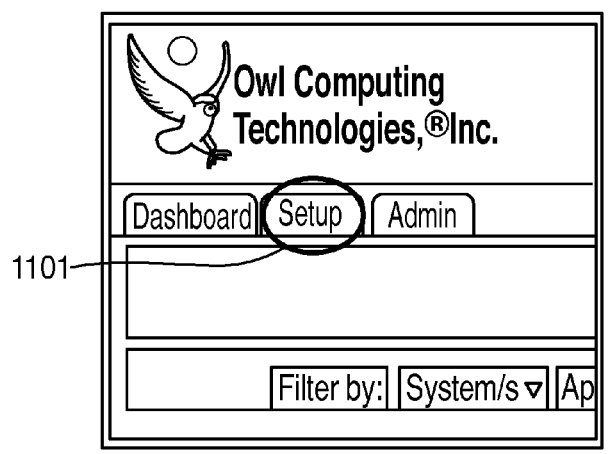
FIG. 11 is a partial screen shot of the OPMS web server browser window showing the setup tab in the OPMS global display page.

The OPMS system is designed to automatically identify and monitor Owl applications and additionally may be configured to monitor non-Owl applications by registering such applications via the setup tab 1101 shown on the OPMS global display screen of FIG. 11. The administrator selects the setup tab 1101 and the OPMS system presents a setup menu 1201, shown on the left hand side of FIG. 12, that allows the user to register (1) custom applications and (2) alert notifications and to view (1) a list of custom apps being monitored and (2) a list of notifications.

Figure 12:
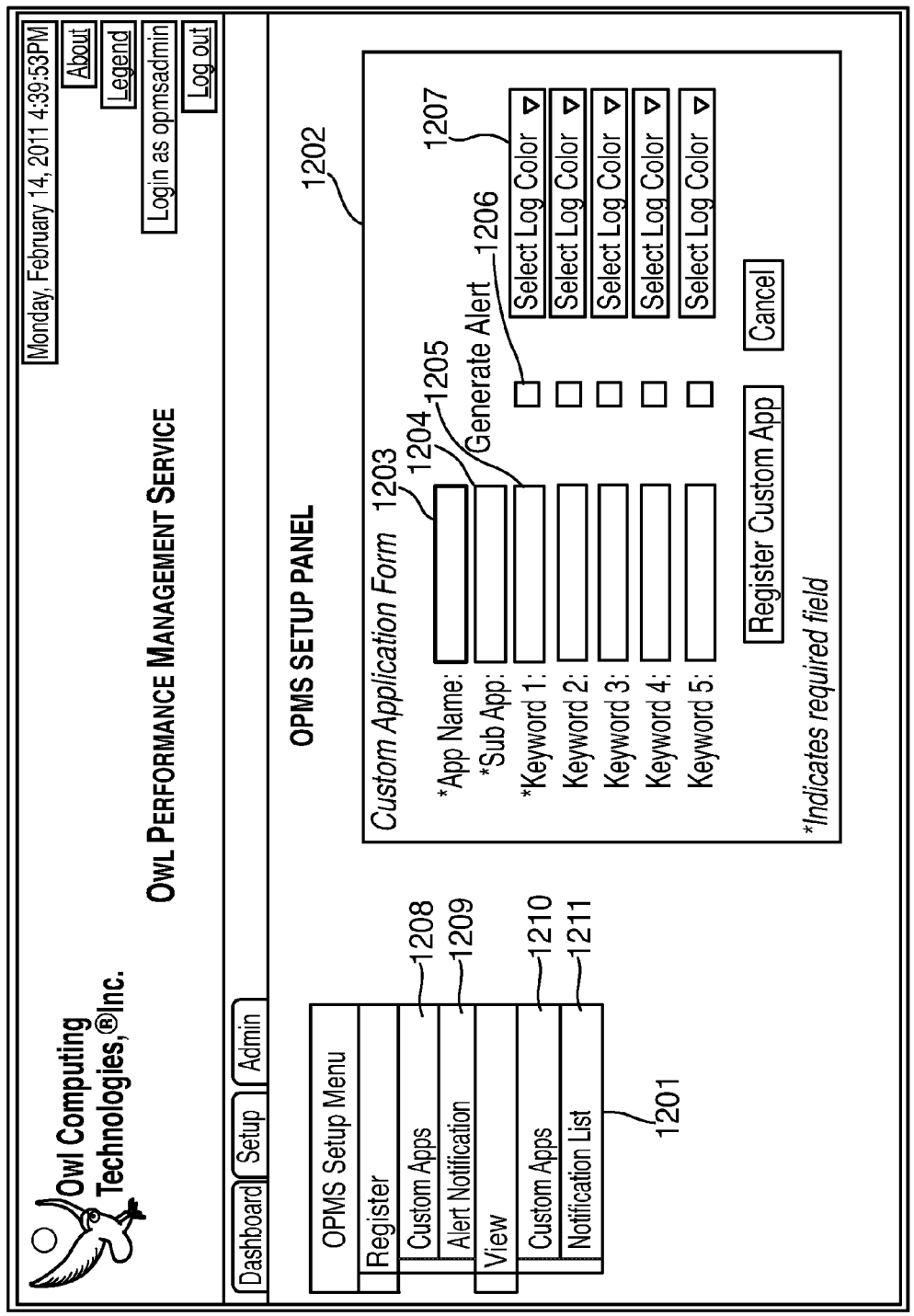
FIG. 12 is a screen shot of the OPMS web server browser window showing the custom application form page of the OPMS administrative setup panel.

Upon selection of the register custom applications button 1208 on the left hand side of FIG. 12, the administrator is presented with the form 1202 shown on the right hand side of FIG. 12, which allows the administrator to register the application by entering setup parameters for each non-Owl application to be monitored. Non-Owl applications will be automatically added to the global display screen (FIGS. 14 and 15) as soon as they are registered on the Setup tab and the OPMS receive application receives valid log data from such application. No additional setup or configuration efforts are required of the user. Form 1202 includes fields for (1) Application Name (APP) 1203—the name of the application to be monitored (e.g., SNMP, Syslog, etc.); (2) Sub-application Name (SUB_APP) 1204—an additional designator for the application that will help differentiate it from multiple instances of the same application (e.g., BLUE or RED for Owl applications, a platform name, or some similar designator); (3) Keywords 1205—specific log terms used for searching (e.g., Error, Warning, or Failure). Form 1202 also includes a "Generate Alert" box 1206 next to each keyword entry and when box 1206 is selected (e.g., checked by clicking thereon), the application status shown on the global display screen will change (from a check mark in green box to a flashing red circle) when one of the entered keywords appears in the associated log. Preferably, at least one keyword must be entered for each non-Owl application. Form 1202 further allows the user to customize the duplicate log file to set specific colors for the text corresponding to the keywords entered at setup. In particular, the user may, for each keyword entered, select a color from the associated dropdown list 1207. All text in the log file with that keyword in it will then appear in the chosen color.

Figure 13:
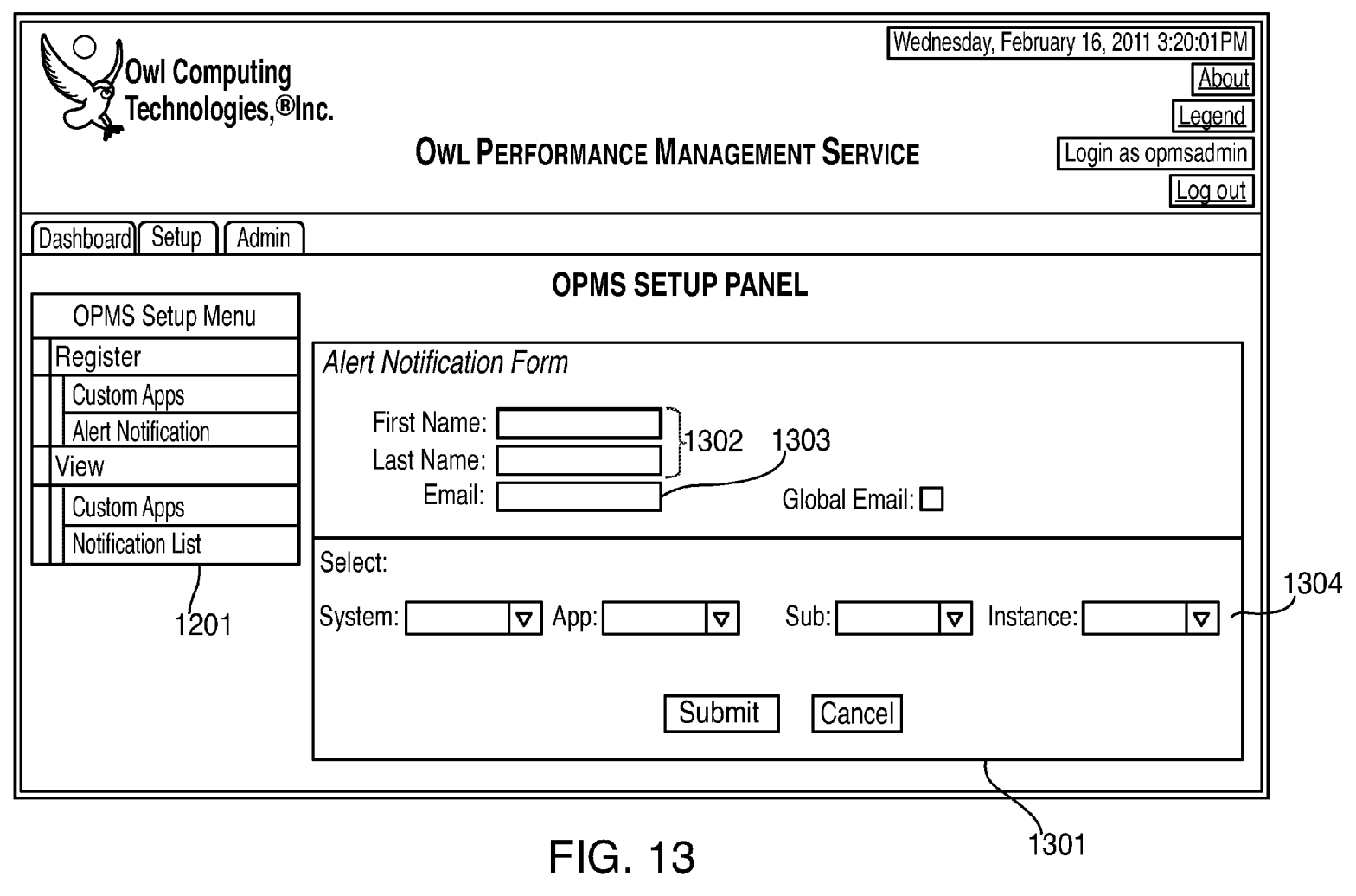

The OPMS setup menu also provides additional user features. Selecting the alert notification button 1209 presents the user with a form 1301 (FIG. 13) with fields that allows the user to enter the name (field 1302), e-mail addresses (field 1303) and set the specific system, application, sub-application, and instance for notification for each associated recipient (fields 1304). When an error message or an event for which there is a keyword entered occurs in the log, an e-mail will be generated and sent to each registered user. Selecting the custom apps button 1211 (FIG. 12) will show a list of all non-Owl applications registered for monitoring, along with each application's setup parameters. Further, clicking on the notification list button 1211 will show a list of the names of all registered e-mail recipients, along with the associated e-mail addresses and the applications registered for notification.

Figure 14:
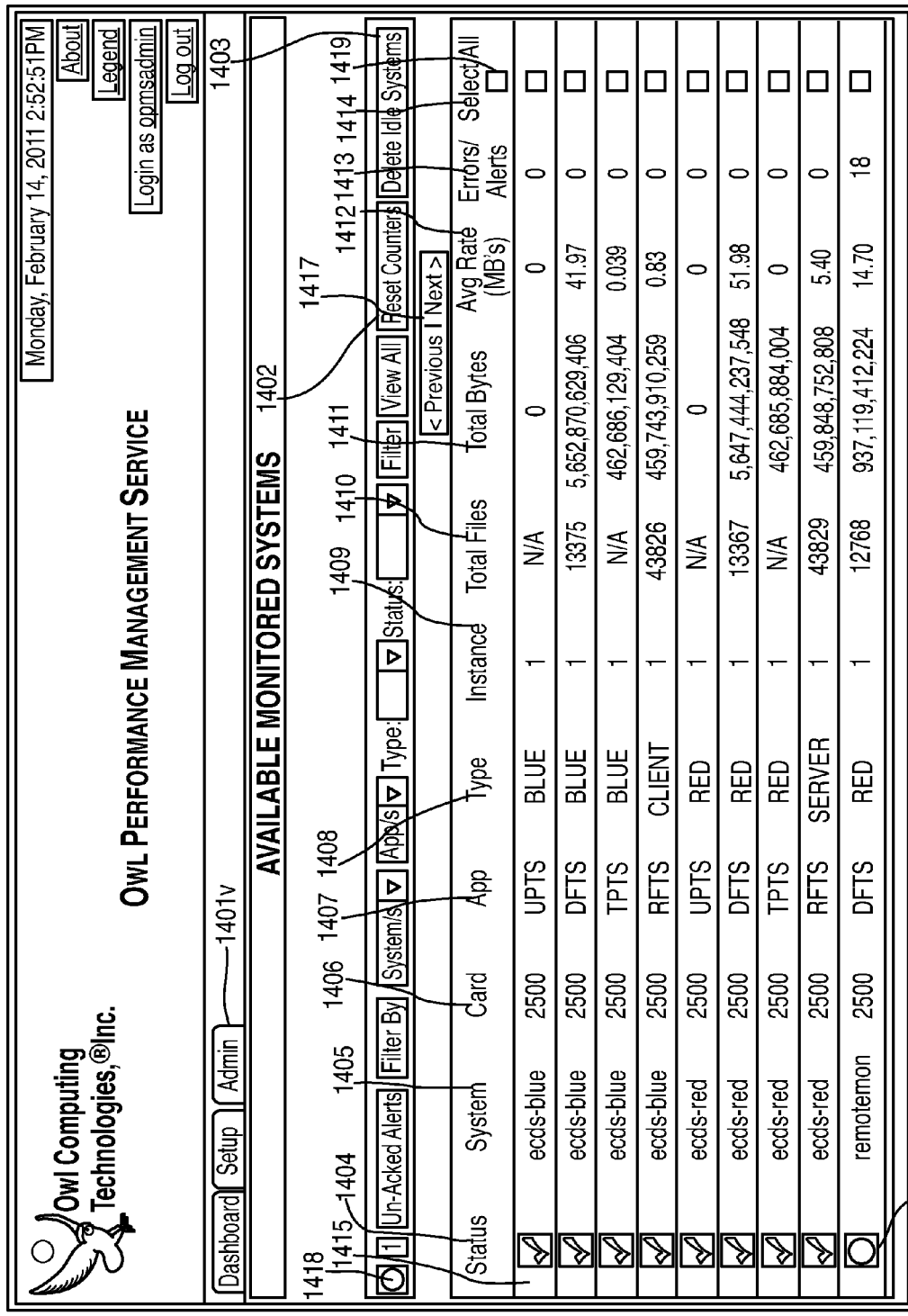
FIG. 14 is a screen shot of the OPMS web server browser window showing the administrator global dashboard page.
Figure 15:
FIG. 15 is a screen shot of the OPMS web server browser window showing the user global dashboard page.

FIG. 14 shows the OPMS dashboard (global display screen) 1400 for administrator users and FIG. 15 shows the dashboard 1500 for general users. The main differences between are that that the administrator dashboard 1400 includes an additional admin tab 1401 and also includes a reset counters button 1402 and a delete idle systems button 1403. In operation, each application being monitored is listed on the dashboard in a row basis (e.g., row 1415) by server name (System 1405) with additional identification data such as card type (Card 1406), application (App 1407), sub-application (Type 1408) and instance (Instance 1409) provided on a column basis (as shown in FIGS. 14 and 15). The dashboard 1400, 15000 also includes columns that show, for each applications, a summary of activity that may include the total number of files moved (Total Files 1410), total size in bytes (Total Bytes 1411), average rate of transfer (Avg. Rate 1412), and the total number of errors and/or alerts (Errors/Alerts 1413).

Figure 16:
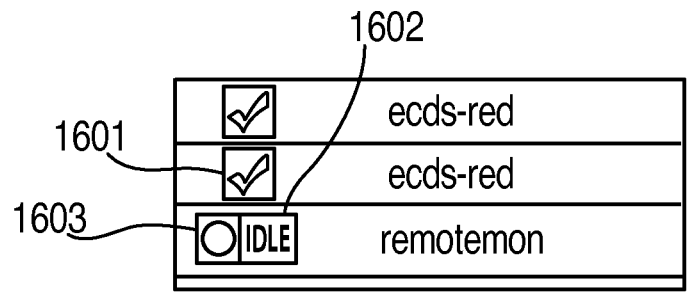
FIG. 16 is a partial screen shot of the OPMS web server browser window showing the three types of status symbols used in the OPMS system.
Figure 17:
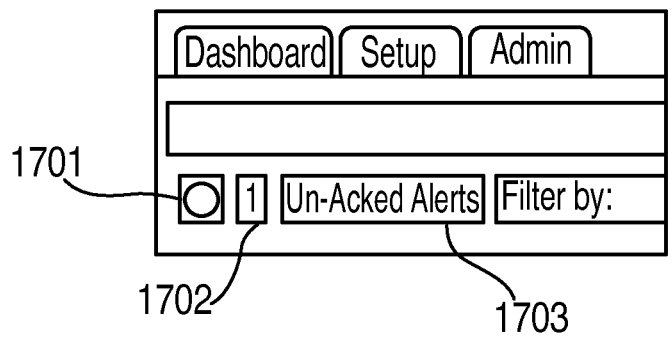
FIG. 17 is a partial screen shot of the OPMS web server browser window showing how errors are displayed.

The dashboard 1400, 1500 will show up to fifteen CDS systems. If more are being tracked, the buttons 1417, 1517 may be provided that become active and highlighted so that the user can page to additional screens to view the additional systems being monitored. The dashboard 1400, 1500 also includes an initial Status column 1404 that provides the current real time state of each application by way of colored icons. The status column 1404 may include one (or more) of three status symbols, which are shown in detail in FIG. 16, including: (1) a green check button 1601 which indicates that the associated application is currently running and that there are no unacknowledged errors in its duplicate log; (2) a blue idle button 1602 which indicates that the associated application is currently idle (i.e., not transferring data); and (3) a red error button 1603 which indicates that there are errors in the duplicate log file for the associated application. The blue idle button 1602 preferably will appear after five minutes have passed without any transfer of data in the associated application and preferably will change back to a green check button 1601 as soon as the associated application starts recording data in its log file again. Preferably, a pop-up is displayed showing how long the associated system has been idle when the user holds the cursor over the blue idle button 1602. The red error button 1603 will preferably appear to flash so that it attracts the user's attention. As shown in FIG. 16, the blue idle button 1602 may appear alongside a red error button 1603 if the associated application being monitored has errors in the log files and there is no activity for at least five minutes. Once OPMS is set up, each monitored application will appear in the application list as soon as the transfer of files is detected (i.e., as soon as there is an entry in the log file for the particular application). Once the monitored application appears in the list, it will show the green check button 1601. The red error button 1603 appears when an error is detected in the duplicate log file for the associated application, but does not indicate whether the application is still running or has stopped. When there is an error condition, an additional error flag 1418 (FIG. 14) appears at the top of the dashboard (shown in detail in FIG. 17). The error flag 1418 shows the error symbol 1701 to get the user's attention, the number of errors detected 1702, and a banner 1703 stating "Un-Acked Alerts" which means that the errors have not yet been acknowledged. When the user clicks on a particular red error button 1603 (acknowledging it), it will change back to a green check button 1601 (clearing the error from the dashboard). The OPMS system may also be configured to automatically send an email message (or other comparable types of messages, e.g., SMS text message) to one or more users upon the detection of an error.

In the dashboard, the displayed applications may be sorted by clicking on a column headers (e.g., System 1405 in FIG. 14). In addition, clicking on any part of a particular row preferably allows the user to view a further page with more detailed information about the associated application, as shown in FIG. 19 and described below. Selecting a box at the end of a row in the Select All column 1414 (e.g., box 1419) and then clicking the reset counter button 1402 will reset the value in all columns for the selected application to 0. Note that, this does not remove any errors from the duplicate logs but instead merely restarts the statistical tracking from a new point. Selecting a box at the end of a row in the Select All column 1414 (e.g., box 1419) and then clicking the delete idle systems button 1403 will remove the selected application from tracking Note that this operation does not uninstall the OPMS send component from the source and monitoring will resume when the OPMS send component starts sending data to the OPMS receive component (i.e., when the system is no longer idle). As shown from a comparison of FIG. 14 and FIG. 15, the reset counter and delete idle systems functions are only available to administrator users.

Figure 18:
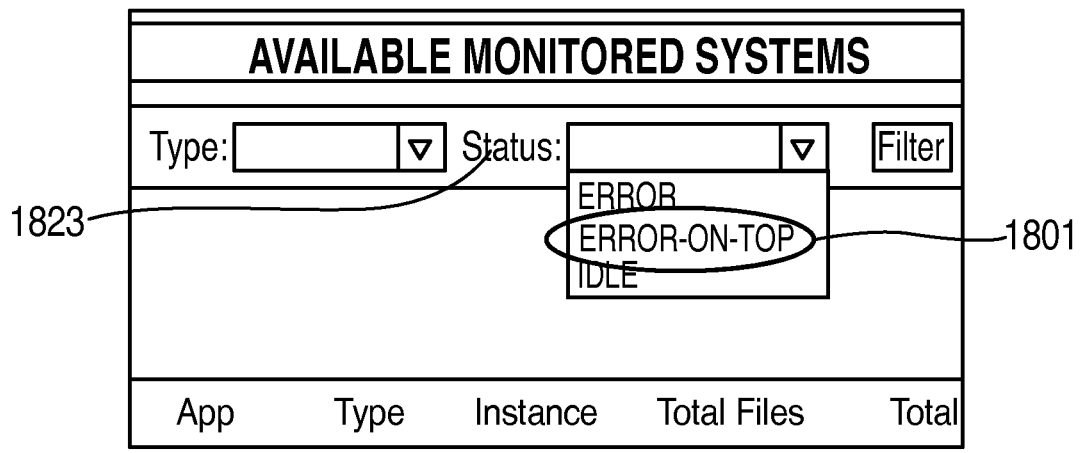
FIG. 18 is a partial screen shot of the OPMS web server browser window showing the sort selection dropdown menu.

A row of buttons and fields at the top of the dashboard view 1400, 1500 allows the user to filter the applications displayed by selecting any combination of the following attributes: System 1520; Application 1521; Type (Sub-Application) 1522; Status (Error, Error-on-top, or Idle) 1523, and then selecting the filter button 1524. Returning all monitored systems to the dashboard can be accomplished by clicking the View All button 1525. The same functions are provided in the administrative dashboard 1400 and the user dashboard 1500, but are only provided with reference numerals in FIG. 15 for clarity. Filtering may preferably be used to automatically sort the applications so that those containing errors are at the top of the screen by selecting the "ERROR-ON-TOP" option 1801 from the Status menu 1523, as shown in detail in FIG. 18: When this option is selected, any new errors that occur will automatically cause the associated application to appear in the top row (or rows in the case of multiple errors) of the dashboard 1400, 1500. This may be particularly useful for large systems where the list of applications extends beyond one page since it cause any applications with errors to be more visible.

FIG. 19 shows a detailed view of the OPMS system page 1900 for a single Owl application (in this case, DFTS) and sub-application (Blue, or Send). System page 1900 provides detailed status information for a single application. The hostname 1901 (here "ecds-blue") appears at the top of the page 1900. In addition, a monitor info box 1902 provides system, application and status information (here, hostname of ecds-blue, application type of DFTS-BLUE-1—i.e., DFTS Send application, instance "1" and current status of OK—i.e., currently running with no errors. System page 1900 also includes a box 1903 and an associated bar chart 1909 that show performance data for the associated application over an interval of ten minutes, and a box 1904 and associated bar chart 1910 that show overall performance data for the associated. The two bar charts preferably only appear on displays for file transfer applications (e.g., DFTS, RFTS, and OSMS). An additional box 1911 appears below the two bar charts which includes an indicator called "File Transfer Activity" that shows the status of the currently transferred file, e.g., shown as file transfer is complete (100%) in FIG. 19. Also in box 1911 is a section that provides specific details of the current file being transferred, including name (Word-clean.doc), the time that the file transfer started, the current time, the size of the file, and the file name. Finally, certain user controls are provided on page 1900. The Reset View button 1906 zeroes out the totals on the screen (e.g., Total Files, Total Bytes, Total Errors, etc.) when selected (preferably only for administrative users). The View Log button 1907 provides a list of the log files (current and archived) for the associated application, with the current log appearing at the top of the list. These logs (see FIG. 24 can provide the user with more detailed performance data for the associated application, along with any error messages. The View Errors button 1908 provides the user with a detailed error log (partial example shown in FIG. 15).

Figure 20:
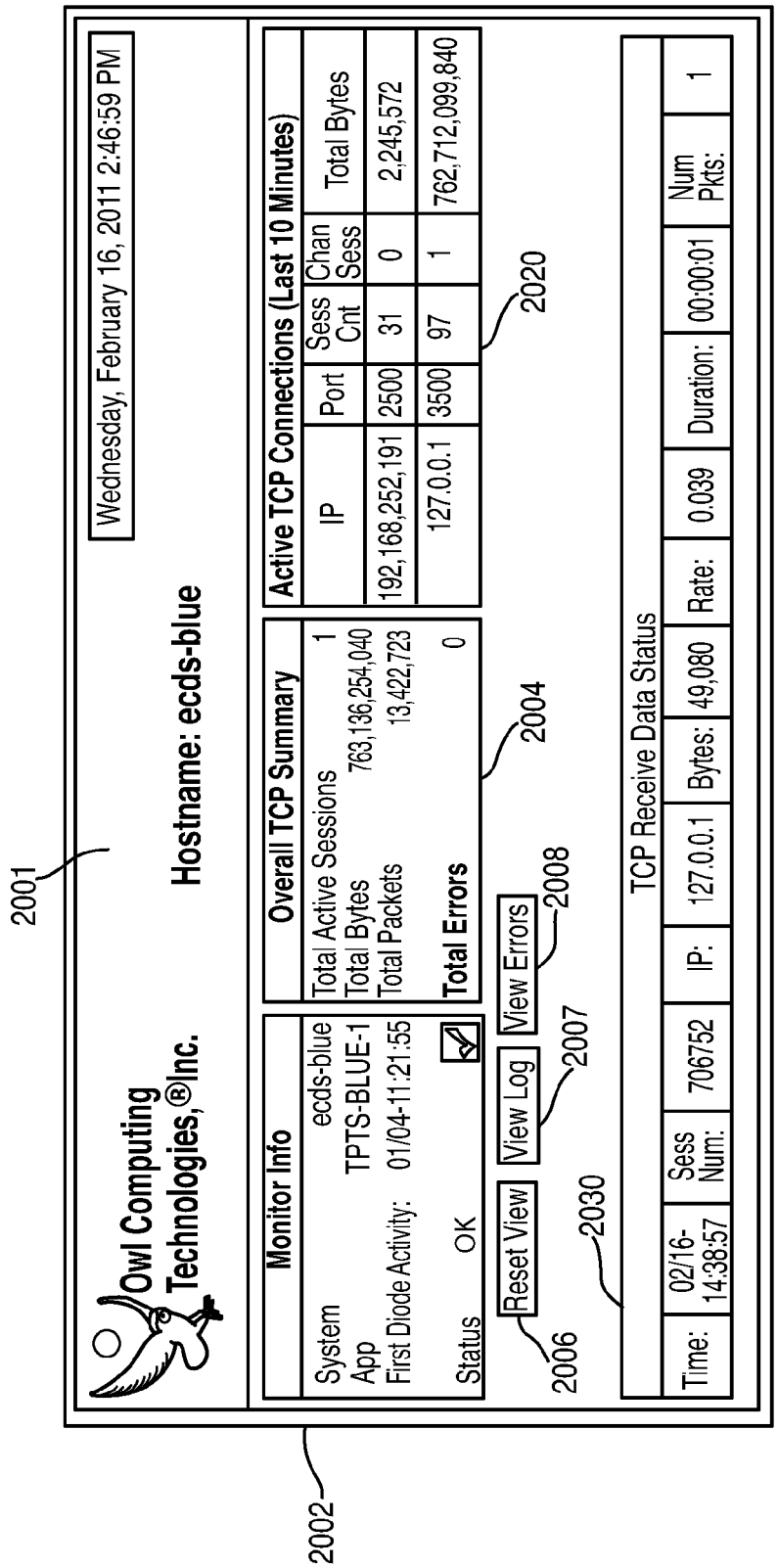
FIG. 20 is a screen shot of the OPMS web server browser window showing the detailed status page for a monitored file transfer application using TCP ports.

FIG. 20 shows a detailed view of the OPMS system page 2000 for a single application using TCP ports for transfer. Page 2000 includes the hostname 2001 (here "ecds-blue") at the top, a monitor info box 2002 and an overall summary box 2004 in the same manner as page 1900 discussed above. Page 2000 also includes buttons 2006, 2007 and 2008 that operate in the same manner as corresponding buttons in FIG. 19. There are two additional sections in page 2000 which are not included in page 1900 that provide statistics on the TCP ports in use. An Active TCP Port Statistics box 2020 shows the following information: a. IP address, b. Port number, c. Number of times port has been used, d. Channel session, e. Total number of bytes transferred via this port. All ports used within the last ten minutes will be displayed and a currently-active port will preferably be highlighted in green. A bottom section 2030 provides more specific information regarding the active port, including the following: a. Date and time that the highlighted session ran, b. Session number, IP address, and port number, c. Number of bytes transferred during this session, d. Duration of the session, e. Rate of transfer, f. Number of Owl packets used to transfer the file.

Figure 21:
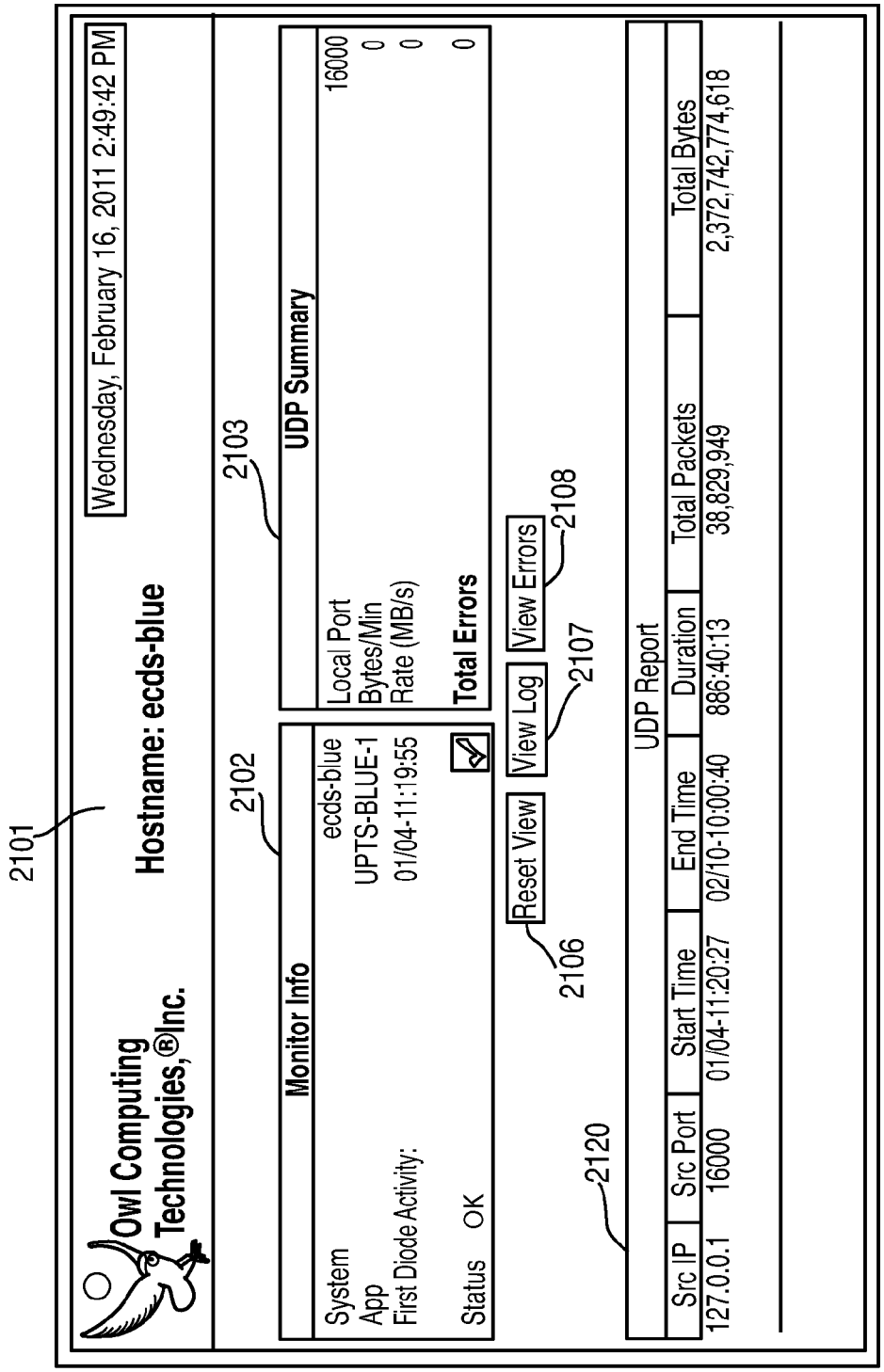
FIG. 21 is a screen shot of the OPMS web server browser window showing the detailed status page for a monitored file transfer application using UDP ports.

FIG. 21 shows a detailed view of the OPMS system page 2100 for an application using UDP ports for transfer. Page 2100 includes the hostname 2101 and a monitor information box 2102, as with FIGS. 19 and 20. Page 2100 also includes buttons 2106, 2107 and 2108 that operate in the same manner as corresponding buttons in FIG. 19. In addition, a UDP Port Statistics box 2130 provides the following information: a. Local port number, b. Transfer rate in bytes per minute, c. Transfer rate in megabytes per second, d. Total number of errors during the transfer session. Finally a UDP Report box portion 2120 provides the following information regarding the active port: a. Source IP address, b. Source port number, c. Start time and end time for the active transfer session, d. Duration of the transfer session, e. Total number of packets sent during the session, f. Total number of bytes transferred during the session.

Figure 22:
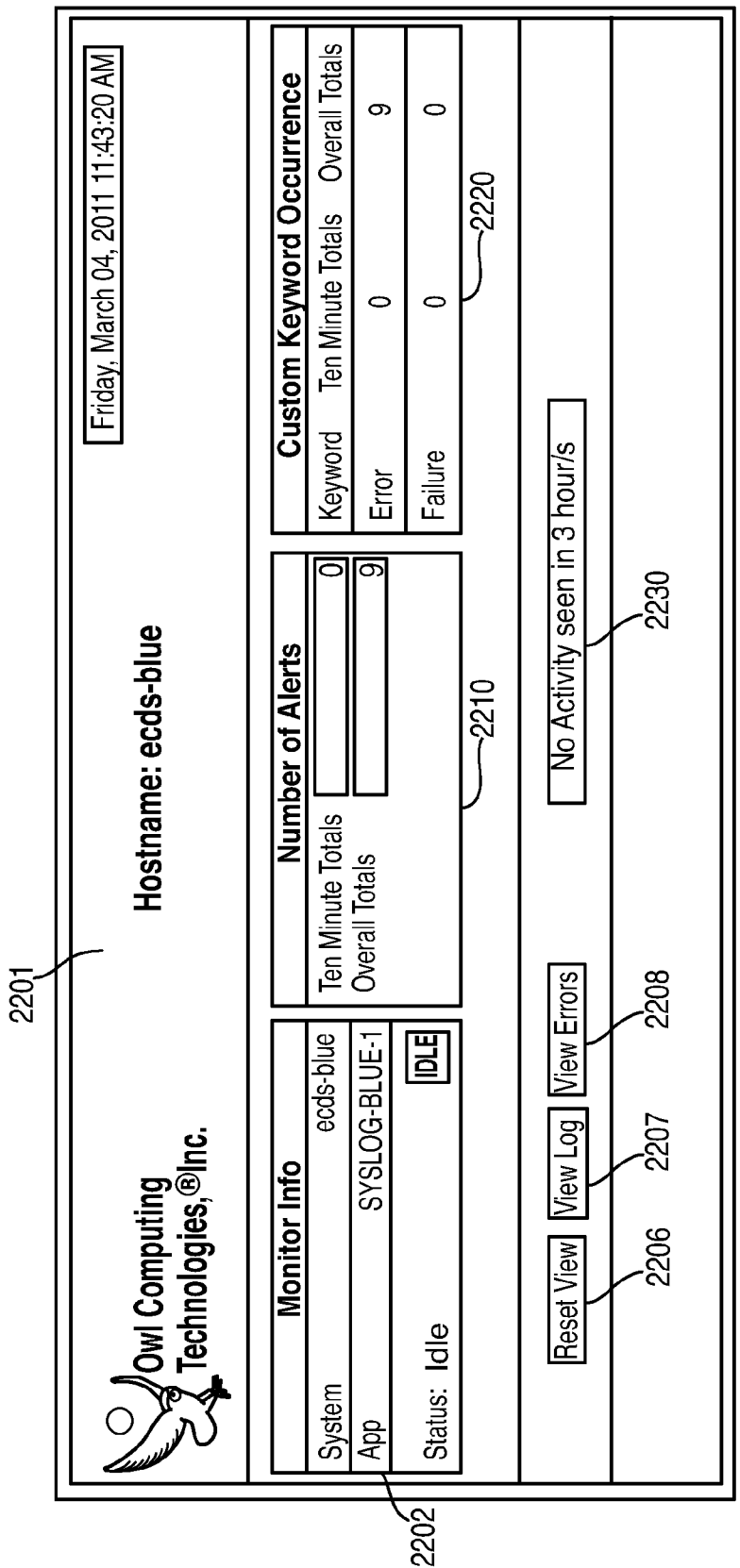
FIG. 22 is a screen shot of the OPMS web server browser window showing the detailed status page for a custom monitored file transfer application.

FIG. 22 shows a detailed view of the OPMS system page 2200 for a single custom application (in this case, SYSLOG). Page 2200 shows the hostname 2201, the monitor details 2202 section, the number of alerts section 2210, the custom keyword occurrence section 2220 and an activity banner 2230. Page 2200 also includes buttons 2206, 2207 and 2208 that operate in the same manner as corresponding buttons in FIG. 19. The monitor details section 2202 shows the system name, i.e., ecds-blue, the application, i.e., syslog, sub-application, i.e., Blue (Send), instance, i.e., 1, and status, i.e., currently idle. The number of alerts section shows the number of alerts for this application, both within the last ten minutes (highlighted in green) and overall (highlighted in red). Alerts include all events indicated by keywords set when the application was registered, as shown the custom keyword occurrence section 2220. Finally, the activity banner 2230 provides an overview of status, here "No activity seen in 3 hours."

FIG. 23 shows an error message screen 2300 displaying the errors logged for a specified application, sub-application, and instance (in this case, DFTS BLUE 1). The information displayed includes the following information organized in column fashion: 1. Date and time that the error occurred 2301, 2. Name of the file that failed to transfer 2302, and 3. Description of the type of error 2303. A refresh button 2311, when selected, refreshes the display to show any additional errors that have occurred since screen 2300 was generated. A clear errors button 2312, when selected, clears the existing error messages from display on screen 2300 and may, preferably, also clear the error log. Note that this does not clear the errors from the duplicate log itself (e.g., the one being created by the Owl OPMS application). Preferably, the clear errors button 2312 is only available to Administrative users. A close button 2313 closes the error display screen 2300.

The OPMS application produces a duplicate of the log file for the associated monitored application. As discussed above, this file is accessed by clicking the View Log button 1907 on the application detail screen 1900, for example. Note: This file is a re-creation of the application log file constructed from the log data received by OPMS and is not the actual log file on the source server. There is no way to modify the source log file from within the OPMS application.

Archived log files are preferably kept for a maximum of seven (7) days. Users can view a list 2400 shown in FIG. 24 of the archived log files, organized by ID 2401, File Name 2402, and Size 2403, and can select an archived log file for selecting the log file name. Users can also select one or more archived log files for deletion using the select boxes (e.g., select box 2405) in the select column 2404 and the delete selected button 2406. The first screen that appears contains a list of the available logs. The current log will be the top entry on the list 2400. The archived logs will follow; each archive log has a filename that provides the system, APP, SUB_APP, Instance, and a date-time stamp.

FIG. 25 shows a sample 2500 of the duplicate log file created by the OPMS application, and as the actual log file is too long to fit on a single screen, shows only a partial view of the file. Error messages, e.g., messages 2501, 2502, 2503 appear in the log in red text for greater visibility. Missing sequence numbers may be highlighted in an alternative color, e.g., yellow.

Other features implemented by the OPMS system include paging across multiple systems; system level monitoring statistics, e.g., disks, memory, CPU, load; additional user levels; graphs that provide system level monitoring data; ability to retrieve all application errors; and access to archive logs.

The OPMS system provides the ability to remotely monitor logs produced by one or more Owl applications running in a one-way data transfer system, such as the system shown in FIG. 2. The OPMS system monitors logs created on the BLUE Send-only server 201 and the RED Receive-only server 2211 (or, as discussed above, from applications running external to the BLUE or RED servers or in different configurations as shown in FIGS. 3 to 6, for example). In operation, the OPMS system displays transfer statistics including the number of files transferred, number of errors, number of bytes, etc. in real time. In addition, as discussed above, the OPMS system provides a copy of each monitored system's log files remotely for viewing via a web browser. Further, unlike any known conventional systems, the OPMS system provides a method to reconcile file transfer activities between different end-points in a cross-domain system (CDS). Although the OPMS system as described above monitors error identified in the log files, the reconciliation process identifies additional errors not identified in the log files by comparing the number of files transmitted by a send-only server and the number of files received by a receive-only server and identifying any differences, meaning lost files (usually files transmitted but not received).

The OPMS system reconciliation provides in real-time a report of the file transfer activities between different source and destination applications. This report can be viewed remotely by using a web browser, as discussed above. The report includes the number of files sent versus the number of files received from each side of the CDS. Files that are not received are highlighted for further investigation and actions. In order to reconcile the file transfer activities between different source and destination pairs, a host configuration file is specified which defines the mapping between the systems and their applications. Reconciliation can occur on an end-to-end basis or there may be multi-level reconciliation where it occurs at different stages as the file passes through the CDS.

As discussed above, Owl applications (and third party applications) that are used to transfer files through the one-way cross domain transfer system create individual log files detailing information about the transfer. In the present system, these logs are tailed for new records and the records are encrypted and forwarded by the OPMS send application to the OPMS reconciliation server for processing. The OPMS server keeps an internal store of files sent and files received for each application running on the source and destination systems configured via the host map configuration file. Files that are not received within five minutes of the time sent are considered to be lost, hence reported as not being received.

As discussed above, FIG. 2 shows an end-to-end reconciliation with a Directory File Transfer System (DFTS). The transmit application 202 on the BLUE server 201 and the receive app 212 on the RED server each sends encrypted log data to the OPMS receive app 221 where reconciliation is done. FIGS. 3 to 7 show alternative methods of log data transmission to the OPMS receive app.

FIG. 26 shows the reconciliation screen 2600 in the OPMS system, accessed via a tab 2601. Screen 2600 includes a navigation section 2602, a reconciliation overview section 2603, a reconciliation statistics summary section 2604 and an OPMS reconciliation summary section 2605. The OPMS reconciliation summary section 2604 includes a number of columns for each monitored system, including source system 2610, application 2611, source type 2612, instance 2613, files sent (for source) 2614, destination system 2615, destination type 2616, files received (for destination) and missing files. As evident from screen 2600, the reconciliation of the two monitored systems shows no missing files for both monitored systems, an equal number of files being transmitted and received for each and no missing files shown in the missing files column 2618.

Figure 27:
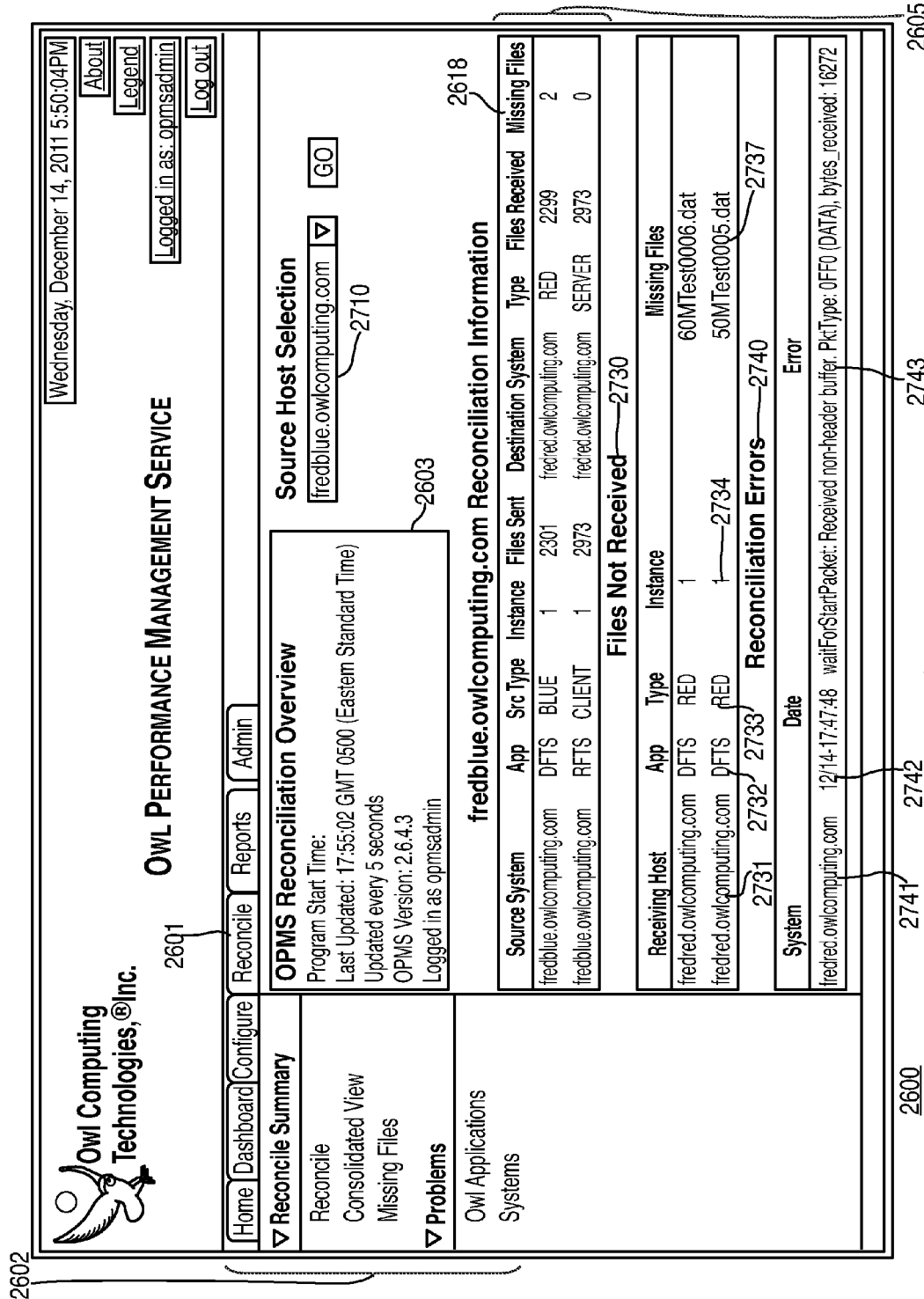
FIG. 27 is a screen shot of the OPMS web server web browser window showing the reconciliation screen after detection of file transfer errors.

FIG. 27 shows the reconciliation screen 2600 in the OPMS system when reconciliation identifies one or more reconciliation errors. As shown in FIG. 27, screen 2600 is shifted to include a source host selection menu 2710 (instead of the reconcile statistics summary 2604) and also includes a files not received section 2730 and a reconciliation errors section 2740. Note that in this case, the missing files column 2618 in the OPMS reconciliation summary section 2605 shows two missing files, in red, for the monitored DFTS application. The files not received section 2730 includes a receiving host column 2731, an application column 2732, a type column 2733, an instance column 2734 and an identification of the missing filename column 2735. The reconciliation errors section 2740 includes a system column 2741, a data column 2742 and an error column 2743. The reconciliation screen 2600 thus provides the user with detailed information about failed file transfers across one-way data transfer systems, while maintaining the integrity of the one-way data transfer system.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for monitoring status of a first and second network and/or of devices coupled to the first or second network, comprising:
   a send node;
   a first status monitoring application associated with the send node which outputs a first status log file containing information about status of a first network coupled to the send node and/or of any first devices coupled to the first network;
   a receive node coupled to the send node via a data link;
   a second status monitoring application associated with the receive node which outputs a second status log file containing information about status of a second network coupled to the send node and/or of any second devices coupled to the second network; and
   a receive application for receiving and processing the first status log file and the second status log file to either identify any unauthorized status conditions identified in the first status log file and/or the second status log file or store the first status log file and/or the second status log file;
   wherein the data link is a one-way data link, wherein the send node is on a first server and is only able to send data over the one-way data link, wherein the receive node is on a second server and is only able to receive data over the one-way data link, and wherein the first server is coupled to the second server only via the one-way data link.

2. The system of claim 1, wherein the receive application is on a third server, separate from the first server and the second server.

3. The system of claim 2, further comprising:
   a first communications link for coupling the first status monitoring application to the receive application; and
   a second communications link for coupling the second status monitoring application to the receive application.

4. The system of claim 3, wherein the first communications link transfers the first status log file from the first status monitoring application to the receive application and wherein the second communications link transfers the second status log file from the second status monitoring application to the receive application.

5. The system of claim 4, wherein the first communications link and the second communications link are one-way data links.

6. The system of claim 2, wherein the first status monitoring application outputs the first status log file to the one-way data link and further comprising:
   a pass-through circuit associated with the receive node for receiving the first status log file from the one-way data link; and
   a communications link for coupling the second status monitoring application and the pass-through circuit to the receive application.

7. The system of claim 6, wherein the communications link transfers the first status log file from the pass-through circuit to the receive application and the second status log file from the second status monitoring application to the receive application.

8. The system of claim 7, wherein the communications link is a one-way data link.

9. The system of claim 1, wherein the information included within the first status log file indicates whether a removable storage device is mounted on any of the first devices and the information included within the second status log file indicates whether a removable storage device is mounted on any of the second devices.

10. The system of claim 1, wherein the first status log file is created by the first status monitoring application to include the information about status of the first network coupled to the send node and/or of any first devices coupled to the first network; and wherein the second status log file is created by the second status monitoring application to include the information about status of the second network coupled to the send node and/or of any second devices coupled to the second network.

11. The system of claim 1, wherein the first status log file is a preexisting log file which is modified by the first status monitoring application to add the information about status of the first network coupled to the send node and/or of any first devices coupled to the first network; and wherein the second status log file is a preexisting log file which is modified by the second status monitoring application to add the information about status of the second network coupled to the send node and/or of any second devices coupled to the second network.

12. A system for monitoring status of a first network and/or of devices coupled to the first network, comprising:
   a send node;
   a first status monitoring application associated with the send node which outputs a first status log file containing information about status of a first network coupled to the send node and/or of any first devices coupled to the first network;

a receive node coupled to the send node via a data link; and a receive application for receiving and processing the first status log file to either identifying any unauthorized status conditions identified in the first status log file or to store the first status log file; wherein the data link is a one-way data link, wherein the send node is on a first server and is only able to send data over the one-way data link, wherein the receive node is on a second server and is only able to receive data over the one-way data link, and wherein the first server is coupled to the second server only via the one-way data link.

13. The system of claim 12, wherein the receive application is on a third server, separate from the first server and the second server.

14. The system of claim 13, further comprising a first communications link for coupling the first status monitoring application to the receive application.

15. The system of claim 14, wherein the first communications link transfers the first status log file from the first status monitoring application to the receive application.

16. The system of claim 15, wherein the first communications link is a one-way data link.

17. The system of claim 13, wherein the first status monitoring application outputs the first status log file to the one-way data link and further comprising:
a pass-through circuit associated with the receive node for receiving the first status log file from the one-way data link; and
a communications link for coupling the pass-through circuit to the receive application.

18. The system of claim 17, wherein the communications link transfers the first status log file from the pass-through circuit to the receive application.

19. The system of claim 18, wherein the communications link is a one-way data link.

20. The system of claim 12, wherein the information included within the first status log file indicates whether a removable storage device is mounted on any of the first devices.

21. The system of claim 12, wherein the first status log file is created by the first status monitoring application to include the information about status of the first network coupled to the send node and/or of any first devices coupled to the first network; and wherein the second status log file is created by the second status monitoring application to include the information about status of the second network coupled to the send node and/or of any second devices coupled to the second network.

22. The system of claim 12, wherein the first status log file is a preexisting log file which is modified by the first status monitoring application to add the information about status of the first network coupled to the send node and/or of any first devices coupled to the first network; and wherein the second status log file is a preexisting log file which is modified by the second status monitoring application to add the information about status of the second network coupled to the send node and/or of any second devices coupled to the second network.

23. A system for monitoring status of a second network and/or of devices coupled to the second network, comprising:
a send node;
a receive node coupled to the send node via a data link;
a second status monitoring application associated with the receive node which outputs a second status log file containing information about status of a second network coupled to the send node and/or of any second devices coupled to the second network; and
a receive application for receiving and processing the second status log file to either identify any unauthorized status conditions identified in the second status log file or store the second status log file; wherein the data link is a one-way data link, wherein the send node is on a first server and is only able to send data over the one-way data link, wherein the receive node is on a second server and is only able to receive data over the one-way data link, and wherein the first server is coupled to the second server only via the one-way data link.

24. The system of claim 23, wherein the receive application is on a third server, separate from the first server and the second server.

25. The system of claim 24, further comprising a second communications link for coupling the second status monitoring application to the receive application.

26. The system of claim 25, wherein the second communications link transfers the second status log file from the second status monitoring application to the receive application.

27. The system of claim 26, wherein the second communications link is a one-way data link.

28. The system of claim 23, wherein the information included the second status log file indicates whether a removable storage device is mounted on any of the second devices.

29. The system of claim 23, wherein the first status log file is created by the first status monitoring application to include the information about status of the first network coupled to the send node and/or of any first devices coupled to the first network; and wherein the second status log file is created by the second status monitoring application to include the information about status of the second network coupled to the send node and/or of any second devices coupled to the second network.

30. The system of claim 23, wherein the first status log file is a preexisting log file which is modified by the first status monitoring application to add the information about status of the first network coupled to the send node and/or of any first devices coupled to the first network; and wherein the second status log file is a preexisting log file which is modified by the second status monitoring application to add the information about status of the second network coupled to the send node and/or of any second devices coupled to the second network.

* * * * *